(12) United States Patent
Sands et al.

(10) Patent No.: US 6,799,225 B2
(45) Date of Patent: *Sep. 28, 2004

(54) CONTROLLERLESS MODEM

(75) Inventors: G. Byron Sands, Spring, TX (US);
Peter J. Brown, Houston, TX (US);
Don A. Dykes, Houston, TX (US);
Andrew L. Love, Spring, TX (US);
Kevin W. Eyres, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

This patent is subject to a terminal disclaimer.

(21) Appl. No.: 09/778,511

(22) Filed: Feb. 6, 2001

(65) Prior Publication Data

US 2001/0037414 A1 Nov. 1, 2001

Related U.S. Application Data

(63) Continuation of application No. 09/237,636, filed on Jan. 26, 1999, now Pat. No. 6,185,628, which is a continuation of application No. 08/685,310, filed on Jul. 22, 1996, now Pat. No. 5,864,710

(60) Provisional application No. 60/010,909, filed on Jan. 31, 1996.

(51) Int. Cl.[7] .......................... G06F 13/14; G06F 3/00; G06F 9/455; H04B 1/38

(52) U.S. Cl. ........................ 710/5; 710/1; 710/106; 703/23; 703/24; 703/25; 709/321; 709/324; 375/220; 375/222

(58) Field of Search ........................ 710/1, 5, 8, 21, 710/62–64, 71–73, 100, 106; 703/13, 21–26; 709/321, 324, 327; 375/220, 222; 379/93.05

(56) References Cited

U.S. PATENT DOCUMENTS

| | | | | |
|---|---|---|---|---|
| 5,170,470 A | * | 12/1992 | Pindar et al. | 710/8 |
| 5,678,059 A | * | 10/1997 | Ramaswamy et al. | 710/1 |
| 5,787,305 A | * | 7/1998 | Chen | 715/540 |
| 5,812,820 A | * | 9/1998 | Loram | 703/20 |
| 5,864,710 A | * | 1/1999 | Sands et al. | 710/5 |
| 6,185,628 B1 | * | 2/2001 | Sands et al. | 710/5 |

* cited by examiner

Primary Examiner—Jeffrey Gaffin
Assistant Examiner—Tanh Nguyen

(57) ABSTRACT

A computer system implements a standard modem without the use of a microcontroller. Instead, a digital signal processor is provided on an expansion card, but with direct links to the computer system itself. The code usually implemented in the microcontroller is instead implemented as a virtual modem controller to be called by the operating system of the computer itself. Further, this virtual modem controller includes a virtualized UART, that appears to the operating system software as a hardware UART, with entry points for calls to replace input/output instructions. In this way, standard device driver code written to execute input/output operations is easily converted to operate with the "virtualized" UART.

34 Claims, 19 Drawing Sheets

CONTROLLERLESS MODEM

CROSS-REFERENCE TO RELATED APPLICATIONS

This application is a continuation of U.S. application Ser. No. 09/237,636, filed Jan. 26, 1999, now U.S. Pat. No. 6,185,628, which is a continuation of U.S. application Ser. No. 08/685,310, filed Jul. 22, 1996, now U.S. Pat. No. 5,864,710, which claims priority to U.S. application Ser. No. 60/010,909, filed Jan. 31, 1996, which are incorporated herein for reference.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to modems used in personal computers, and more particularly to a modem wherein the controller and UART functions are performed by the host CPU using software organized as virtualized driver and modem modules, with the modules communicating via a virtualized UART interface.

2. Description of the Related Art

Most of today's personal computers include some form of modem fumctionality. High speed modem systems are typically incorporated onto an option card, and usually include a "data pump" for supporting the various protocols of modem communication, such as the V.22, V.22bis, V.32, V.32bis, and V.34 (28.8 Kbps) protocols recommended by the International Telegraph and Telephone Consultative Committee (CCITT). The data pump itself typically includes a DSP (digital signal processor) for performing modulation, demodulation and echo cancellation and a coder-decoder (CODEC) for performing analog to digital (A/D) and digital to analog (D/A) conversion. Analog signals from the phone line are digitized by the CODEC and then demodulated by the DSP to extract the original digital data sent by an external device. This procedure is reversed for data transmitted by the modem to the external device.

In prior modems, support logic to interface the modem to the computer system has typically included a microcontroller for establishing a communications link, controlling the sequence of events to originate or answer a call, and to transmit or receive digital data from the computer system through a universal asynchronous receiver transmitter (UART) across the I/O bus. The microcontroller also typically performs error correction procedures, such as those according to the V.42 protocol, as well as compression/decompression procedures, such as those according to the V.42bis protocol recommended by the CCITT.

The UART was originally designed as an intelligent microchip for serial interfacing, typically serializing data presented over a bus (or serial transmission such as over an RS-232 communications link) and receiving such data, converting it to parallel form, and sending it over a bus. Access to a UART chip is typically gained through a personal computer system's I/O ports (typically COM1 and COM2). Typical representatives include the UART 8250 and 16450 chips by National Semiconductor Corporation.

The hardware portions of modem devices contribute substantially to the ultimate cost of such modems. Further, they contribute to the size of such modems. Any reduction in the component count of such modems is desirable because it results in lower costs.

Further, ease of upgradability and portability across different operating system platforms is important to modem makers in today's age of rapidly changing technology and quick obsolescence. Manufacturers are faced with the pressure of trying to recover the cost of hardware development in the face of shortened product lifecycles. Therefore, any reduction in such hardware development is similarly desirable.

BRIEF SUMMARY OF THE INVENTION

In a modem according to the preferred embodiment, the UART and microcontroller functions are virtualized and implemented in software (the "modem module") run on the host processor. The modem module interfaces with a second layer (the "virtual device driver layer") that includes an operating system-specific virtual port driver that interacts with the operating system. This dichotomized architecture is advantageous in that the modem module software remains virtually unchanged when the modem is used in conjunction with different operating systems (OSs). Most operating systems already incorporate the ability to communicate with a UART. Hence, modifying only the virtual device driver layer is much simpler and more cost effective than attempting to modify both layers.

Implementing portions of the modem hardware as software modules has additional advantages. By leveraging the capabilities of today's powerful microprocessors, high speed modem performance is actually improved over that of "standard" modems by eliminating bottlenecks associated with physical UARTs. Thus, a modem according to the present invention can be cheaper, faster, and easier to upgrade than traditional modem cards.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
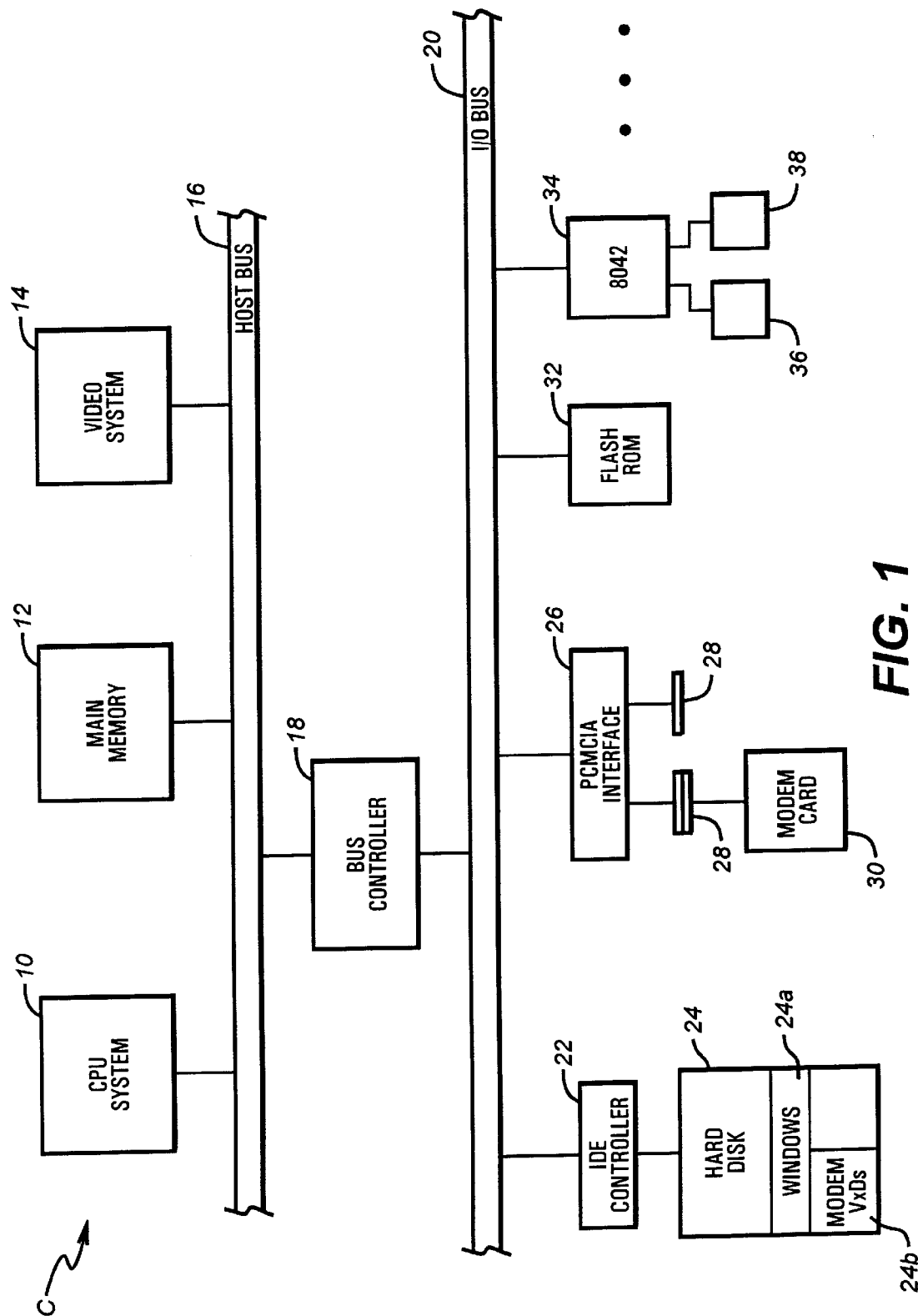
FIG. 1 is a simplified block diagram of a computer system with an optional modem card according to the present invention.

Referring to FIG. 1, a simplified block diagram of a computer system C is shown, including a modem card 30. The computer system C incorporates a central processing unit (CPU) system 10 coupled to a host bus 16. The host bus functions to interface the CPU system 10 to the rest of the computer system C, including a memory array otherwise referred to as the main memory 12. The CPU system 10 may simply be a microprocessor, such as Intel Corporation's 486 or PENTIUM™, or a more complete CPU system including a microprocessor, a cache controller and other components. A video system 14 is also connected to the host bus 16.

The host bus 16 is coupled to the I/O bus 20 through a bus controller 18, which is preferably compatible with the Industry Standard Architecture (ISA) or the Extended Industry Standard Architecture (EISA) bus. The exact architecture of the I/O bus 20 is not critical to the invention.

Connected to the I/O bus 20 are various components conventionally located on the system board of the computer system C. These include the read only memory (ROM) 32, which provides the BIOS and other system level instructions, and an 8042 keyboard controller 34. A keyboard port 36 and an auxiliary or pointing device port 38 are connected to the 8042 keyboard controller 34. A hard disk drive 24 is connected to the I/O bus 20 via an IDE controller 22. The IDE controller 22 contains buffer control logic and generates chip selects for IDE drives during data reads and data writes to IDE devices.

Of interest in this description, a modem card 30 is connected to a Personal Computer Memory Card International Association (PCMCIA) interface 26 through a slot connector 28. The PCMCIA interface 26 provides connectivity to the I/O bus 20. Although originally intended as a memory expansion (standard 1.0) interface, PCMCIA specification 2.0 allows credit card-sized cards to be used for various I/O devices, such as fax modems, SCSI adapters or Global Positioning System (GPS) receivers with a PCMCIA interface. For sake of simplification, modem functions discussed hereinafter are assumed to include the capability to handle facsimile, data, and voice information, since the communication protocols for each are related.

The computer system of FIG. 1 is exemplary, and numerous other computer system designs could be used. Further, the modem card 30 can be located directly on the I/O bus 20 or any other bus utilized by the computer system C, including the host bus 16. The exact location of the modem is not critical to the invention.

Figure 2:
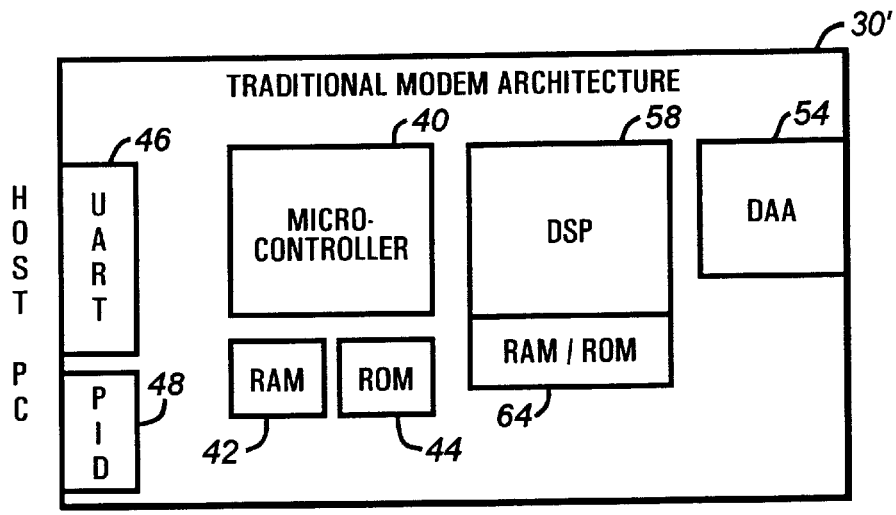
FIG. 2 is a block diagram showing traditional modem hardware in a PCMCIA card.

Referring briefly to FIG. 2, a block diagram of traditional modem hardware is shown. A prior art modem is coupled to a phone line (not shown) through a data access arrangement (DAA) 54, which electrically isolates the modem 30 from the phone line to control emissions of electromagnetic interference/radio frequency interference (EMI/RFI) as required by the Federal Communications Commission (FCC). The DAA 54 also typically isolates the received data from the transmitted analog signals, and develops a digital ring signal to inform the computer system to answer. The DAA 54 is preferably compatible with the public switched telephone network (PSTN) interface. The DAA 54 receives signals from the phone line through a telephone jack, such as an RJ11C used for standard telephones.

Traditional modems also include: a DSP 58 and support memory 64, a microcontroller 40 requiring RAM 42 and ROM 44, a physical UART 46, and a peripheral interface device (PID) 48. In such prior art modems, the microcontroller 40 would typically communicate with the CPU system 10 through the UART 46. The CPU system 10 would send and receive data, using a separate UART, to the UART 46, which would in turn provide the data to the microcontroller 40, as well as send data from the microcontroller 40 to the CPU system 10.

The microcontroller 40, however, could not simply receive data from the CPU 10 and send it over the telephone line, nor could it simply receive data from the telephone line and send it to the CPU 10. Instead, it would typically include the software necessary to implement a modem command set, such as the standard Hayes AT command set. The microcontroller 40 would include software for receiving ASCII commands according to the AT command set over the UART 46, and performing various functions based on those commands. For example, the "ATH" command would cause the microcontroller 40 to "hang up" the DAA 54, disconnecting the modem link. The other commands are well known according to the AT command set. Further, the microcontroller 40 would implement various error correction and data compression protocols. All of these functions are well known to those of ordinary skill in the art. When the software is in the communications mode rather than the command mode, of course, the microcontroller 40 would pass data to and from the UART 46 and to and from the DSP 58. The DSP 58 would then convert that data into appropriate digitized signal levels, and pass that data on to a CODEC 56 (see FIG. 4). To exit the data communications mode and into the command mode, the microcontroller 40 would preferably operate according to the AT command set, and respond to a sequence of three plus signs "+++" by switching to the command mode, allowing the host PC to provide AT commands through the microcontroller 40. One typical microcontroller used for the microcontroller 40 would be the Motorola MC68302 embedded controller.

Figure 3:
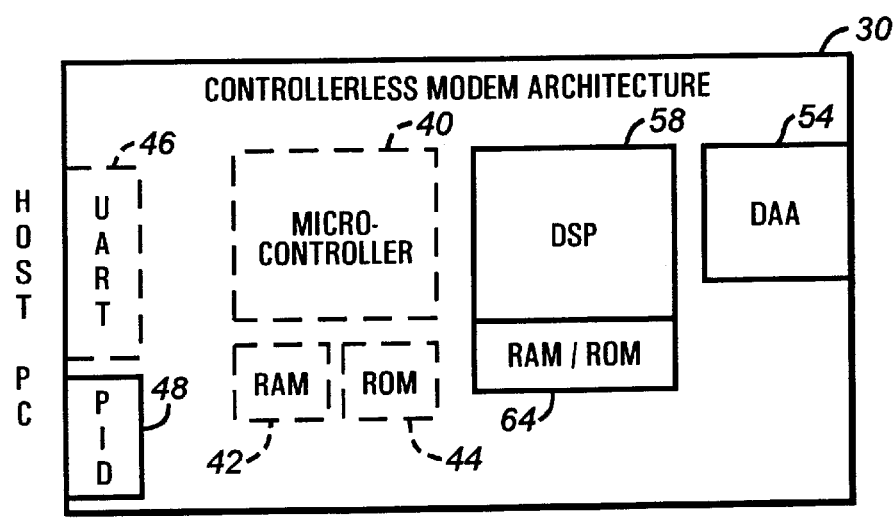
FIG. 3 is a block diagram of modem hardware according to the disclosed embodiment of the invention illustrating eliminated hardware portions.
Figure 5:
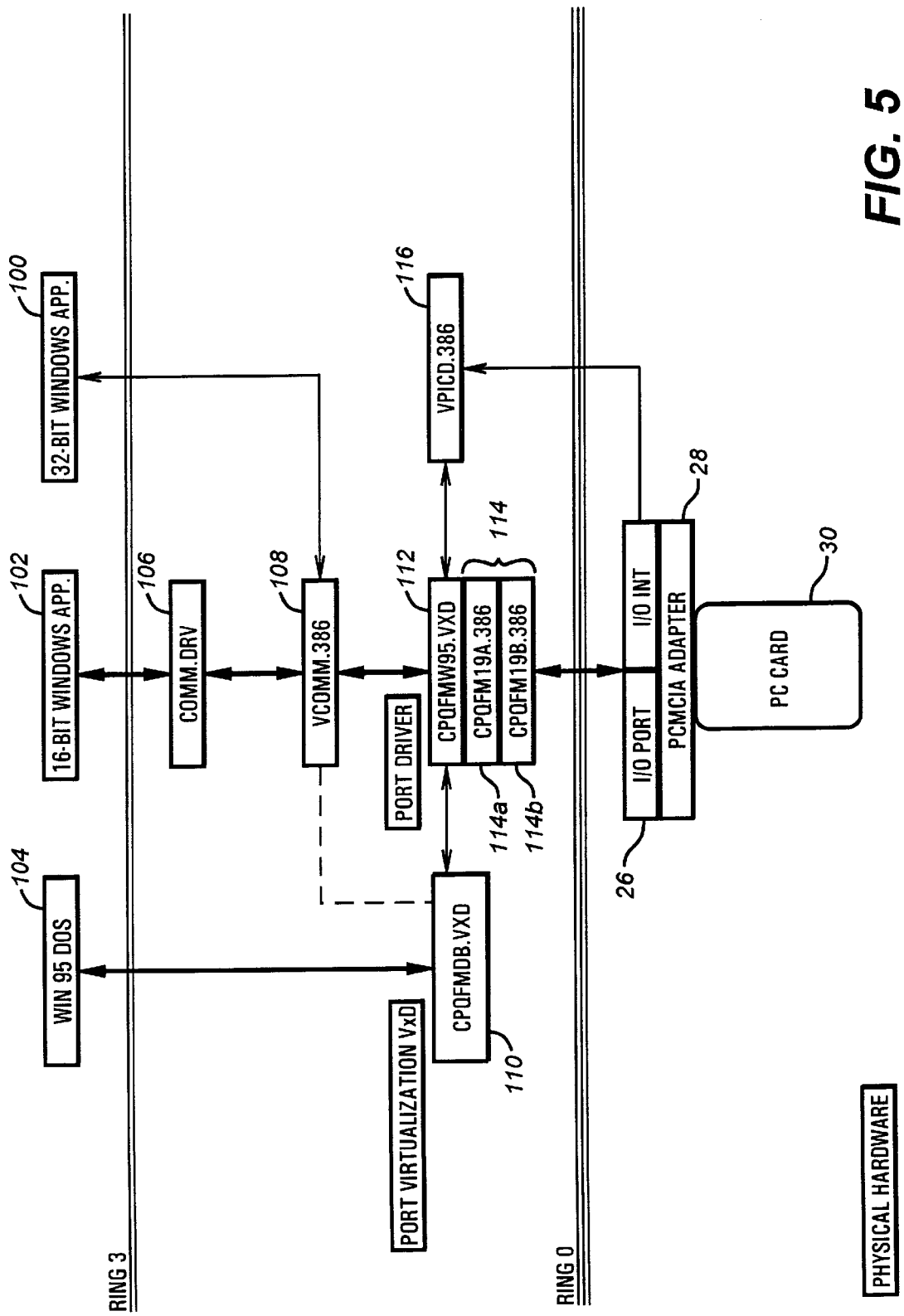
FIG. 5 is a block diagram depicting various software components in a WINDOWS® 95 environment as used with a modem implemented according to the present invention.
Figure 6:
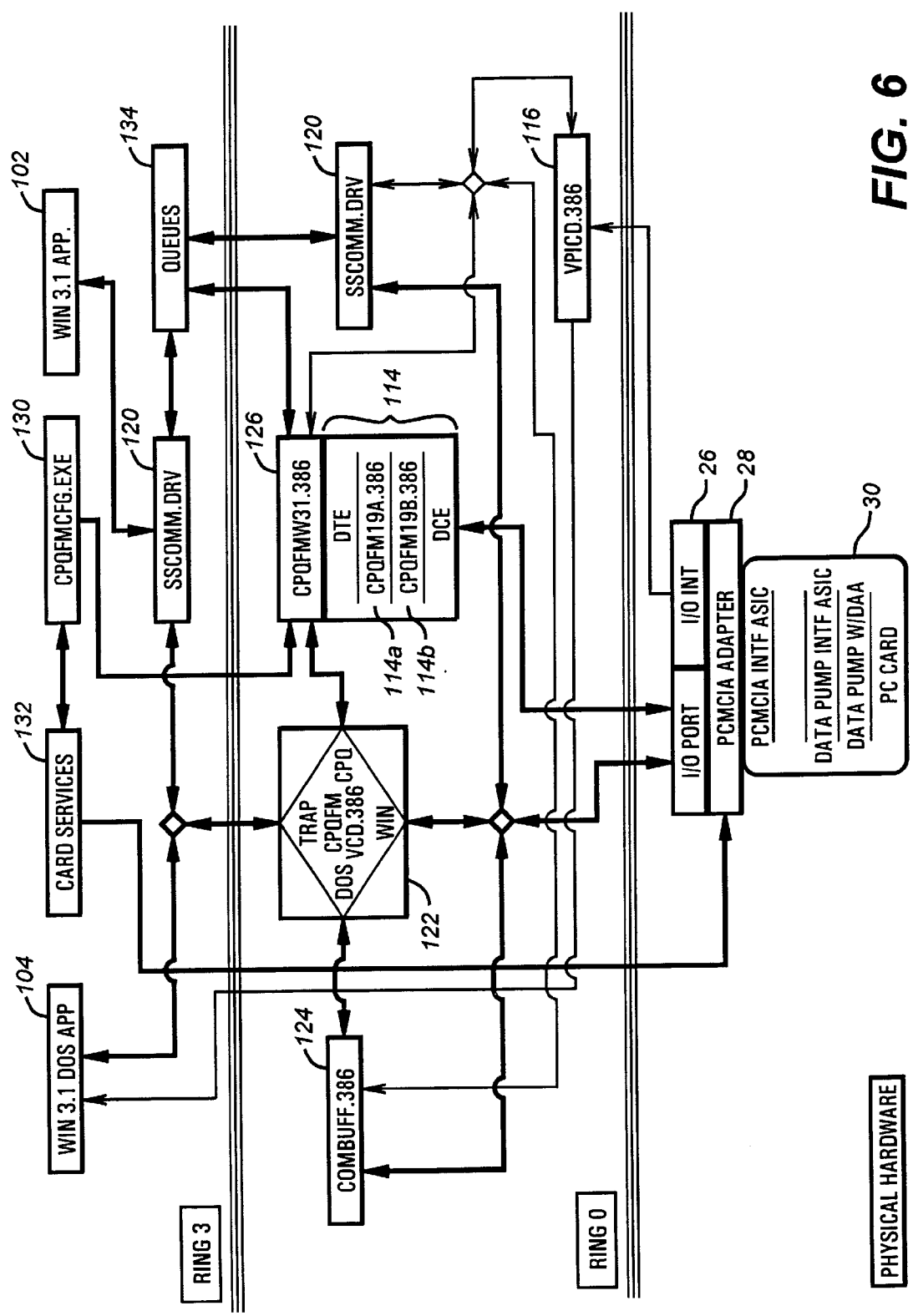
FIG. 6 is a block diagram depicting various software components in a WINDOWS® 3.1 environment as used with a modem implemented according to the present invention.

Referring now to FIG. 3, a block diagram of modem hardware according to the disclosed embodiment of the invention is shown. Physical components that are implemented in software or no longer required are represented by dashed lines. As mentioned, prior art modem systems usually included a microcontroller 40 (FIG. 2) that provided data to the DSP 58, and which also controls the DAA 54, taking it on or off-hook as necessary. To establish a communication link, the microcontroller 40 directs the proper sequence of signals to either originate or answer a telephone call. In a modem according to the preferred embodiment, however, the various microcontroller 40 and UART 46 functions are implemented in a virtualized modem module 114 (FIGS. 5 and 6). This software implementation results in substantial monetary savings and increased data rates. Further, the microcontroller 40 and the UART 46 are preferably implemented as a module independent from other operating system software, so that the virtualized versions of the microcontroller 40 and the UART 46 can be easily moved to other operating systems.

Figure 4:
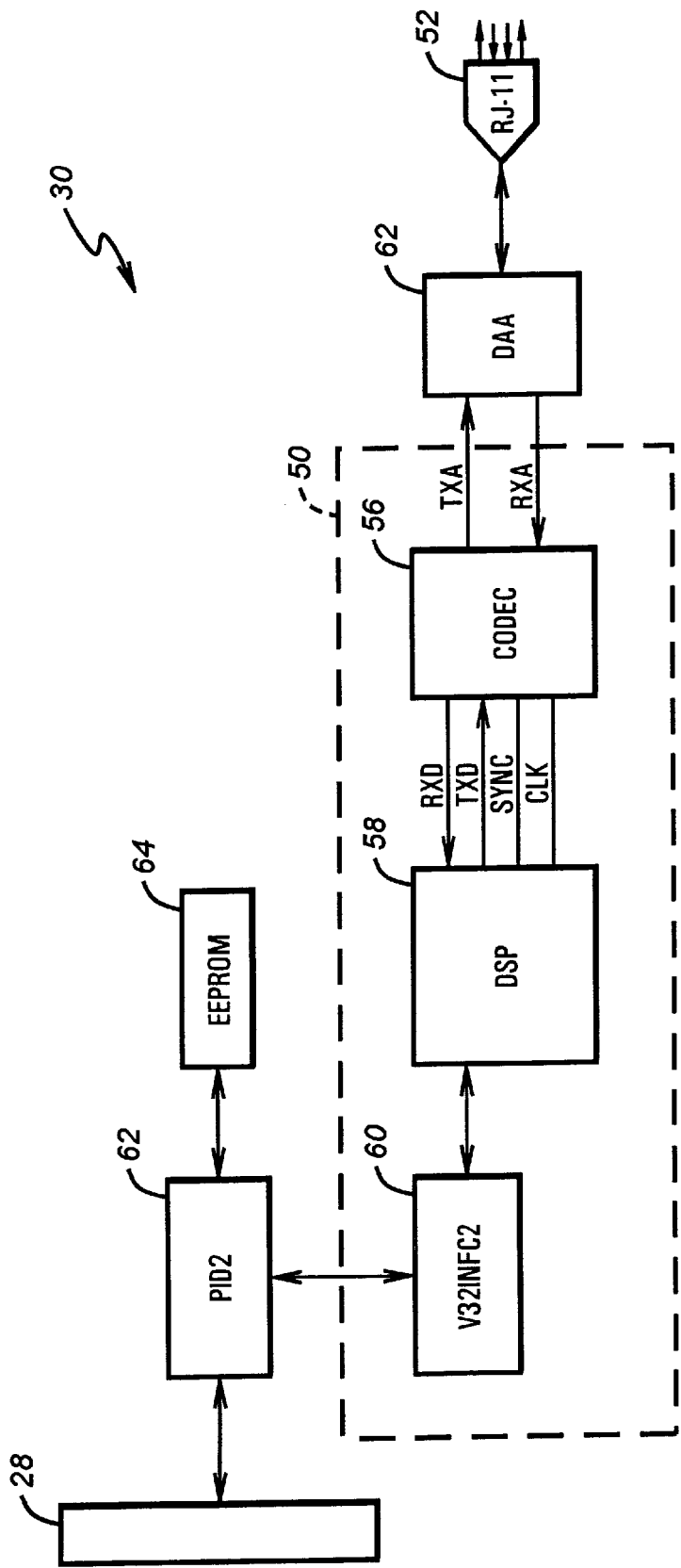
FIG. 4 is a detailed block diagram of a modem card according to the present invention.

Proceeding now to FIG. 4, a modem card 30 according to the present invention is shown in greater detail. A PCMCIA host interface application specific integrated circuit (ASIC) PID2 62 is used to connect the modem card 30 to the computer system C through the PCMCIA slot connector 28. PID2 62 is also connected to an EEPROM 64, which contains the Card Information Structure (CIS) that is loaded into the PID2 62. In the preferred embodiment, the EEPROM 64 is manufactured by National Semiconductor Corporation. The PID2 62 is further connected to an interface ASIC V32INFC2, which in turn provides an interface for a DSP chip 58. The DSP 58 performs calculations to provide desired modem functions. In the preferred embodiment, the DSP 58 is a conventional DSP16A manufactured by AT&T Microelectronics.

The DSP 58 generally converts the digital data from the computer system C into a digitized analog waveform that provides to the CODEC 56. The CODEC 56 then provides a true analog waveform to the DAA 54. The DSP 58 also receives a digitized analog waveform from the CODEC 56. The CODEC 56 receives a true analog waveform from the DAA 54 and converts that analog data into digital data for the computer system C. The DSP 58 also preferably performs echo cancellation to cancel signals echoed back to the modem 30 due to the transmitted signal.

The CODEC 56 is connected to the DSP 58 by four signals referred to as RXD, TXD, SYNC and CLK. The RXD and TXD signals are the receive and transmit digital signals, while the SYNC and CLK signals are conventional signals as utilized between a DSP 58 and a CODEC 56. Together, the V32INFC2 60, DSP 58 and CODEC 56 form what is commonly referred to as a "data pump" 50. The data pump 50 is typically a modem data pump chip set supporting the various protocols of modem communication. In the preferred embodiment, the data pump 50 is a DSP16A-V32INFC2-LT V.32bis plus FAX Data Pump Chip Set sold by AT&T Microelectronics.

The CODEC 56 receives an RXA or receive analog signal from the DAA 54, and provides a TXA or transmit analog signal to the DAA 54. The CODEC 56 digitizes analog data from the RXA signal for processing by the DSP 58. Likewise, digital data TXD received from the DSP 58 is converted to analog format onto the TXA signal.

As mentioned, the DAA 54 serves to isolate the modem 30 from the telephone line to meet FCC or national regulations for the control of EMI/RFI interference. Data being received by the DAA 54 from an external device is filtered and provided in analog form to the CODEC 56 on the RXA signal. Similarly, data being transmitted by the modem 30 is provided from the CODEC 56 to the DAA 54 on the TXA signal, which is then asserted by the DAA 54 on the phone line. Data is preferably transferred serially between the DSP 58 and the CODEC 56. Further details of exemplary DAA circuitry can be found in co-pending U.S. patent application Ser. No. 08/304,262, entitled "Modem Having Separate Modem Engine and Data Access Arrangement" and hereby incorporated by reference.

The DAA 54 is connected to a standard telephone line through an RJ-11 phone jack 52. The phone jack 52 is provided to provide and receive certain telephone signals as known to those skilled in the art. Many different kinds of phone line or other transmission media are contemplated, so that the phone jack 52 and DAA 54 would be configured to be compatible with whatever phone line means or transmission media is being used. The present invention is not limited by any particular type of transmission media, phone jack or DAA, so that those shown are used merely for purposes of illustration.

A modem 30 according to the preferred embodiment is ideally able to identify itself according to the method described in the Plug and Play External COM Device Specification. In addition, to qualify for a WINDOWS® 95 logo, the modem 30 must support at least 9600 bits per second (bps) V.32 with V.42/V.42bis protocol for data modems; support the TIA-602 (Hayes®-compatible) AT command set, with extensions for flow control, V.42/V.42bis; support fax capabilities of at least 9600 bps V.29 with class 1 (TIA-578A); and support the 16450A/16550 compatible UART interface. WINDOWS® 95 does support the older 8250 UART chips.

WINDOWS® 95 Background

At the core of WINDOWS® 95 is a 32-bit protected-mode operating system called the virtual machine manager (VMM). The VMM provides services that manage memory, processes, interrupts, and exceptions such as general protection faults. The VMM works with virtual devices (VxDs) to allow the virtual devices to intercept interrupts and faults to control the access that an application has to hardware devices and installed software. Both the VMM and VxDs run in a single, 32-bit, flat model address space at privilege level 0 (also called ring 0). Code running in ring 0 can perform any task the processor is capable of handling, and it can manipulate any memory address in the computer system. Ring 1 has more privilege than ring 2, which in turn has more than ring 3. WINDOWS® 95 uses only ring 0 and ring 3.

In WINDOWS® 95, the VxDs are 32-bit protected mode modules that support the device-independent VMM by managing the computer's hardware devices and supporting software. VxDs support all hardware devices in a typical computer system C, including the direct memory access (DMA) devices, IDE controllers, serial ports, parallel ports, keyboards, and video card adapters. A VxD is required for any hardware device that has programmable operating modes or retains data over any period of time. In short, if the state of a hardware device can be changed by switching between multiple virtual machines or applications, the device usually must have a corresponding VxD.

WINDOWS® 95 allows the user to install custom VxDs to support add-on hardware devices. It is also permissible for a VxD to support software, but no corresponding hardware device.

Modem Software

Referring now to FIG. 5, a block diagram is shown depicting various software components of a controllerless modem implemented WINDOWS® 95 operating system in a according to the present invention. The modem software is organized as software layers interposed between the application that wants to use the modem and the modem itself. WINDOWS® 95 is upwards compatible with both WINDOWS® 3.x and DOS. In a modem according to the disclosed embodiment, therefore, WINDOWS® 95 32-bit applications 100, WINDOWS® 3.x 16-bit applications 102, and WINDOWS® 95 DOS applications 104 are all supported. All of these applications run in ring 3, and each interfaces with the modem module 114 in a slightly different manner.

For 32-bit applications 100, service requests are processed by VCOMM.386 108, the virtual communications driver. VCOMM.386 108 provides protected-mode support for high-speed data ports, as well as conventional RS-232 serial ports (COM ports). VCOMM.386 108 manages all accesses to communications devices, and can support up to 128 serial ports.

VCOMM.386 108 is a standard module implemented in the WINDOWS® 95 operating system, and remains unchanged according to the invention. Its various interface protocols are well known to those of ordinary skill in the art.

In the case of WINDOWS® 3.x 16-bit applications 102, a slightly different execution path is necessary because such applications are unable to use the WINDOWS® 95 architecture. Communications software written for WINDOWS® 3.x relies on being able to use the Win16 Comm API (not shown) to request services, and also expects to interface with the communications driver COMM.DRV 106, another standard module in WINDOWS® 95. COMM.DRV 106 provides a set of exported functions that an application calls to implement the WINDOWS® communications API. In WINDOWS® 95, COMM.DRV 106 is not tied to any specific communications hardware, and is not replaced as was done in previous versions of WINDOWS®. COMM.DRV 106 accesses communications resources by communicating directly with VCOMM.386 108 as if it were a physical port.

For WINDOWS® 3.x applications 102 and 32-bit applications 100, VCOMM.386 108 interfaces with CPQFMW95.VXD 112. CPQFMW95.VXD 112 is a virtual port driver that can call VCOMM.386 108 services directly, or can be used by VCOMM.386 to access communication ports. In WINDOWS® 95, VCOMM.386 requires a virtual port device driver to communicate with the physical hardware. CPQFMW95.VXD 112 provides this virtual device driver. Instead of directly communicating with the UART, however, as described below CPQFMW95.VXD 112 instead communicates with a modem module 114 via a virtual UART represented by a darkened line. In the preferred embodiment, the virtual UART is contained within the modem module 114. In prior art systems, UART chips are the hardware portion of the computer system's COM port that actually communicate between the CPU system 10 and any device attached to the COM port. As mentioned, a UART typically serializes and transmits parallel data, inserting start, parity, and stop bits, and receives serial data that it converts to parallel data. A physical UART provides a variety of other options, including clock controls and configurable registers. Required UART functions are implemented in software in a modem according to the preferred embodiment. Details of the interface between CPQFMW95.VXD and modem module 114 are provided below in conjunction with FIG. 7, and its source code, written in assembly language, is provided in Appendix A.

The modem module 114 also contains the modem code that is typically programmed into a physical microcontroller. For reasons of compatibility with WINDOWS® 3.x, the modem module 114 is separated into two parts, CPQFM19A.386 114a and CPQFM19B.386 114b, but could be unified in the WINDOWS® 95 implementation. As mentioned above, the modem module 114 is not operating system dependent. A Data Terminal Equipment(DTE) portion of modem module 114 emulates a device located at the end of a transmission line which provides or receives data (i.e. computer, telephone, fax, etc.). Further, a Data Communication Equipment (DCE) portion of modem module 114 emulates a device for transmitting data, generally a modem. In the preferred embodiment, the serial data exchange interface between the DTE and DCE portions of module 114 follows the RS-232C standard of the EIA (Electronic Industries Association).

Referring briefly to WINDOWS® 95 DOS applications 104, data again follows a different path to the modem module 114. Data first travels to CPQFMDB.VXD 110, which is a port virtualization VxD that simulates communications hardware for applications running in a WINDOWS® 95 DOS interface, or "DOS box." This source code is found in Appendix B. After registering with VCOMM.386, CPQFMDB.VXD 110 is allowed to redirect data to the virtual port driver CPQFMW95.VXD 112. The interface between CPQFMDB.VXD 110 and CPQFMW95.VXD 112 is shown in more detail in FIG. 7.

The modem module 114 communicates to hardware (particularly the DSP 58) on the modem card 30 through PCMCIA interface 26 and a PCMCIA slot connector 28. For data transmissions, information sent to the DSP 58 by the modem module 114 includes carrier start and stop commands and the data to be sent. Modem AT commands known to those skilled in the art are used by the modem module to decide how to send data to the DSP 58. After receiving the data, the DSP 58 generates the carrier signal and modulates data across the telephone line.

The software for implementing the modem module 114 is in general the same as the software used to program the microcontroller 40 in prior art systems. It could be written in a high level code, such as C, allowing portability between a variety of processors. Further, if the modem module 114 was originally written in C for the microcontroller 40, it can simply be recompiled for use as the modem module 114 according to the invention.

Code for the microcontroller 40 is generally well known to the art. It is available from a number of sources, such as R. Scott & Associates. It is generally written in a high level language, so it can be used with a variety of microcontrollers 40. Referring to the microcontroller 40 of FIG. 2, however, it must be understood that code used in the microcontroller 40 typically expects to communicate with a UART 46 as well as with a DSP 58. According to the invention, the UART 46 is instead implemented as "virtual" code, included in Appendix C. Therefore, a "glue" interface is necessary for the microcontroller 40, so that rather than communicating with a hardware UART 46, it instead communicates with software routines to virtualize the UART 46 as well as the UART normally present within the computer system itself. These "glue" routines are also found in Appendix C. These routines are also used to communicate over the PCMCIA interface with the PCMCIA modem card 30.

Hardware interrupts generated by the DSP 58 are communicated to the virtual port driver CPQFMW95.VXD 112 via an interrupt handler VPICD.386 116. The VPICD.386 116 is a standard Microsoft VxD that is installed as soon as the system is booted. Port drivers must install such interrupt handlers if they are to perform input and output operations using queues.

A block diagram depicting various software components of a WINDOWS® 3.1 modem implemented according to the present invention is shown in FIG. 6. The modem software is organized as software layers interposed between the WINDOWS® 3.1 and WINDOWS® 3.1 DOS applications 102 and 104 and the installed modem card 30.

In DOS applications 104, reads and writes are trapped by the CPU system 10 in a port dependent manner and fault into CPQFMVCD.386 122. The CPQFMVCD.386 122 is a lower level virtual communications driver (VxD) which handles both DOS and WINDOWS® 3.1 applications. The CPQFMVCD.386 122 performs some of the same function as the port virtualization VxD CPQFMDB.VXD 110 (FIG. 5), but in WINDOWS® 3.1 typically further includes the software for actually communicating with the physical port. WINDOWS® 95, as shown in FIG. 5, instead separates the virtual interfaces provided by VCOMM.386 108 and CPQFMDB.VXD 110 from the actual physical interface provided by CPQFMW95.VXD 112 together with the modem software 114. Therefore, CPQFMVCD.386 is preferably modified to allow the datastream to be directed to a prior art modem or other serial port device. For DOS applications 104 that do not use the controllerless modem 30, CPQFMVCD.386 122 acquires the datastream and buffers it through use of COMBUFF.386 124 (a standard Microsoft VxD). p For applications that require the controllerless modem 30, the data is buffered through CPQFMW31.386 126, which actually implements portions of the COMBUFF.386 124 code. CPQFMW31.386 126 is included as Appendix D. The data is then provided to the modem module 114, and is subsequently sent to the modem hardware. All serial port data passes through the CPQFMVCD.386 122, which has routine calls that enable it to communicate with CPQFMW31.386 126 registers. In the disclosed embodiment, CPQFMVCD.386 122 is a Microsoft VxD that has been modified slightly to recognize CPQFMW31.386 126. Communication between CPQFMVCD.386 122 and CPQFMW31.386 126 is illustrated more fully by FIGS. 8A and 8B.

The modem module 114, however, is identical in both the WINDOWS® 3.1 implementation of FIG. 6 and the WINDOWS® 95 implementation of FIG. 5. That is, only the virtual device driver which communicates with a virtual UART within the modem module 114 changes. In WINDOWS® 95, CPQFMW95.VXD 112 (Appendix A) is used to communicate with the virtual UART code of the modem module 114. In the WINDOWS® 3.1 version, the module CPQFMW31.386 126 assumes this role.

For WINDOWS® 3.1 applications 102, communications are handled by a WINDOWS® protected-mode API SSComm.drv 120. SSComm.drv 120 passes data to CPQFMVCD.386 122 through use of software hooks. Data then follows the same path as that as that used for DOS applications.

CPQFMCFG.EXE 130 is a hidden WINDOWS® application that is started along with WINDOWS® 3.1 . CPQFMCFG.EXE 130 registers with Card Services 132, which is a high level interface to Socket Services (a manufacturer dependent method of talking to PCMCIA cards). When a PCMCIA card 30 is inserted, Card Services 132 checks to see if the card is a controllerless modem card 30 according to the present invention. If so, a call is made to CPQFMW31.386 126 to let it know that a conforming card has been installed. CPQFMW31.386 126 then instructs CPQFMVCD.386 122 to direct subsequent modem data to the modem module 114. QUEUES 134 is used to buffer data communicated between SSComm.drv 120 and CPQFMW31.386 126.

Again, a virtualized UART is represented by the darkened line between CPQFMW31.386 126 and modem module 114. The VPICD.386 116, modem module 114, and other system components perform essentially the same functions as those discussed in conjunction with FIG. 5.

Figure 7:
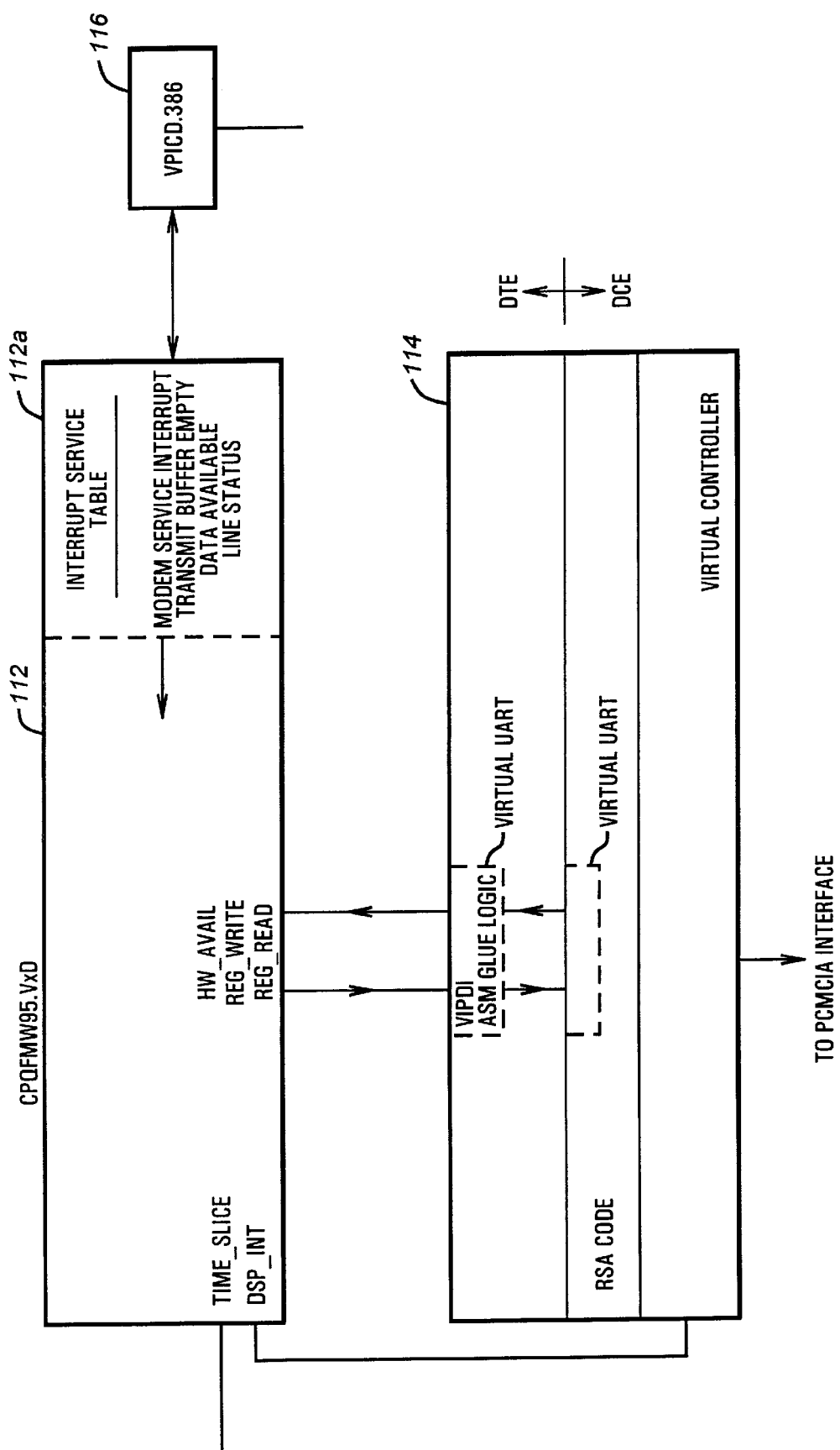
FIG. 7 is a block diagram showing the CPQFMW95.VXD and modem module interface in greater detail.

Referring now to FIG. 7, the CPQFMW95.VXD 112 and modem module 114 interface is shown in greater detail. As mentioned above, the interrupt handler VPICD.386 116 communicates hardware interrupts from the DSP 58 to the CPQFMW95.VXD 112. Further, "virtual" interrupts from the virtual UARTs are ultimately passed through the interrupt handler VPICD.386 116. Illustrated is the case of receive data becoming present in the receive data register of the virtual UART in the modem module 114 coupled to the CPQFMW95.VXD. In that case, an "interrupt" causes a serial interrupt service routine in the CPQFMW95.VXD 112 to examine the interrupt source, found in another register of the same virtual UART of the modem module 114. Based on that source, the interrupt routine jumps, based on an interrupt service jump table 112a to a data available routine. That routine must read data from the virtual UART in the modem module 114.

One must appreciate how standard UART service drivers would read this data from a physical UART. Typically, a x86 assembly language "IN" operation would be performed from the appropriate input/output location. This could be done at ring zero, at which the code of FIG. 7 operates, but in this case, the UART to be read from is a virtual UART. Therefore, instead of performing an "IN" operation, the source code of CPQFMW95.VXD 112 replaces each "IN" instruction with a macro. This macro causes in-line code to be compiled that, instead of performing an "IN" operation, calls the appropriate routine in the virtual UART coupled to CPQFMW95.VXD 112. For write operations to the UART, the corresponding "OUT" input/output operation is replaced with a similar macro.

In this way, standard physical UART virtual device driver code can be used for CPQFMW95.VXD 112, with the "IN" and "OUT" input/output instructions replaced with corresponding macros. Further details of the software interaction of FIG. 7 are found in the flowcharts of FIGS. 9A through 15.

But further, the modem module 114 can remain virtually unchanged between operating systems. It simply presents the "virtual" UART interface to an operating system device driver, with the device driver being slightly modified to call that interface rather than doing a physical input or output. But because of the virtualized interface, the device driver need not be otherwise changed—if it can talk to a UART, it can talk to the virtualized UART.

The interface of the modem controller 114 to the PCMCIA card 30 is done through a standard PCMCIA interface. This portion of the modem module 114 is also preferably isolated from the remainder of the modem module 114, so that changes in the hardware interface can be localized. This interface source code is found in Appendix E.

The modem module 114 is also preferably isolated from the actual system interrupts, specifically interrupts from the DSP 58 on the PCMCIA card 30 itself, by the VPICD.386 116. In this way, the modem module 114 is not dependent on the hardware configuration of the interrupt sources. Further, the modem module 114 is preferably called every 10 ms so that it can perform whatever data processing is necessary to maintain communications with the DSP 58.

Figure 8A:
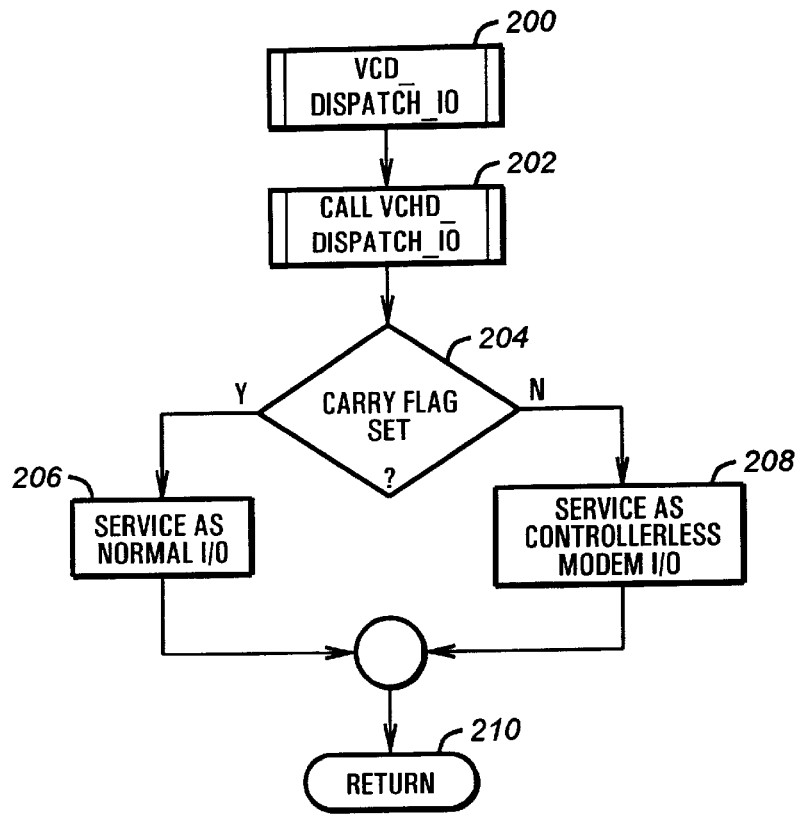
FIGS. 8A and 8B are flowchart diagrams of the routines used by CPQFMVCD.386 to determine if a modem according to the present invention is installed in the computer system.
Figure 8B:
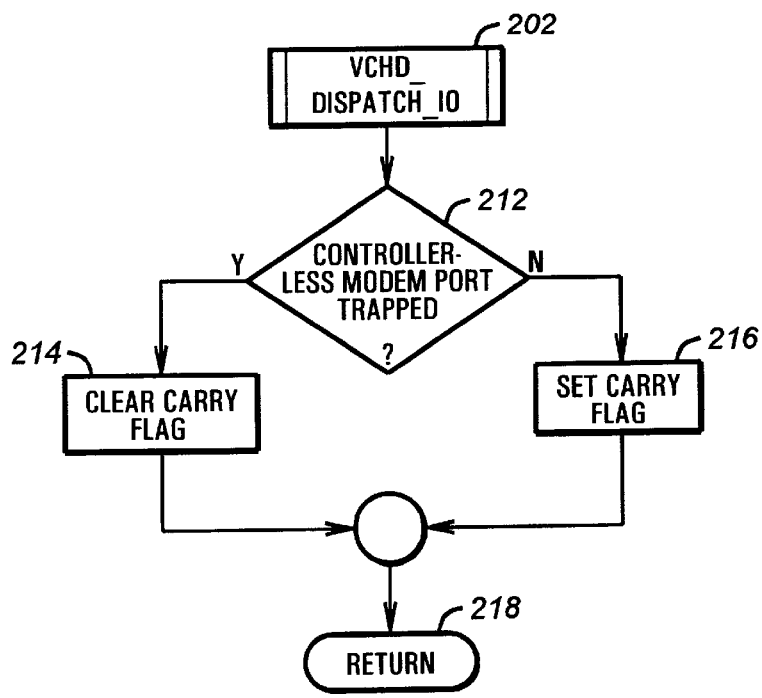

FIGS. 8A and 8B illustrate the routines used by CPQFMVCD.386 122 to determine if a modem according to the present invention is installed in the computer system. Referring first to FIG. 8A, control commences with a routine VCD_DISPATCH_IO 200 following a trapped I/0. This routine is contained within the CPQFMVCD.386 122 software. Control next proceeds to step 202 and a call is made to VCHD_DISPATCH_IO, which is contained within the CPQFMW31.386 126 module. This routine (FIG. 8B) first determines if a controllerless modem port has been trapped.

If so, control proceeds step 214 and the carry flag is cleared. Otherwise, control proceeds to step 216 and the carry flag is cleared. In either case, control next proceeds to step 218 and a return is made to VCD_DISPATCH_IO 200.

Following this return, control proceeds to step 204 where the status of the carry flag is examined. If the carry flag is set, control passes to step 206 and the I/O call is service in a traditional manner. If the carry flag was not set by VCHD_DISPATCH_IO 200, the data call is serviced as a controllerless modem I/O. Following either of steps 206 or 208, control next proceeds to step 210 for a return.

It is contemplated that the arrangement of software modules could be used to support modems operating over conventional RS-232 COM ports or ISDN lines, as well as next-generation parallel port modems.

It can now be appreciated that a modem implemented according to the disclosed embodiment includes various microcontroller and UART functions implemented in a virtualized modem module. This software implementation results in substantial monetary savings and increased data rates. Further, the microcontroller and the UART functions are preferably implemented as a module independent from other operating system software, so that the virtualized versions of the microcontroller and the UART can be easily ported to other operating systems.

The Modularity of the Controllerless Modem

Referring again to FIGS. 5, 6, and 7, one appreciates the distribution of the controllerless modem functionality according to the invention. The CPQFMW31.386 126 module and the CPQFMW95.VXD 112 module in FIGS. 5 and 6 are different manifestations of a virtual device driver, the former compatible with the WINDOWS® 3.1 operating system and the other compatible with WINDOWS® 95 operating system, respectively. The interfaces that these device drivers must present to their associated operating systems are different, but in general they are written to form a software layer between the various system components that must access a UART and the UART itself. To that end, these virtual device drivers, when called by other system software, typically access a physical UART through a series of input/output operations directed to that UART's I/O ports. The writing of device drivers for various operating systems is well known, but once standard device drivers have been written for a new operating system, it is desirable to leave that code unchanged.

But in the controllerless modem according to the invention, the physical UART is of course not present. For each operating system, extensive device drivers for such UARTs, however, do exist. According to the invention, rather than discard this extensive amount of code, or greatly modify it to integrate it into the modem module 114 itself, the interface between the modem module 114 and the virtual device driver is in the form of a "virtual" UART. In this way, one can use standard virtual device drivers with only minor modifications to communicate with the new system implemented modem module 114. Because the modem module 114 includes a "virtual UART," the only real modification necessary to these virtual device drivers is that they replace their input and output operating with corresponding "virtual" operations in the form of calls to the "virtual UART" rather than actual input/output operations to a physical UART itself.

Thus, for changes in operating systems, one only has to slightly revise the appropriate virtual device driver corresponding to the CPQFMW95.VXD 112 module or the CPQFMW31.386 126 module. If the modem hardware 30 remains unchanged, however, the same modem module 114 can be used with little modification. Conversely, if the modem hardware, such as the DSP 58, is changed, then different code for the "virtual" microcontroller in the modem module 114 can be used to access that new DSP.

Using this modular software approach, porting to new operating systems becomes rather simple. Standard modem or UART software for that new operating system can be used—software which should be readily available—and the virtual modem controller in the form of the modem module 114 is simply ported to the new operating system, even being recompiled to a different CPU system 10 if necessary presenting a virtual UART interface to the virtual device driver.

UART Basics

In IBM PC compatible computers, UARTs present a standard series of ports at input/output addresses starting at a base port. These input/output addresses are typically accessed using input and output instructions in the x86 instruction set. Specifically, a typical instruction used to input from one of these ports is "IN AL, DX", which inputs into the AL register the data located at the I/O address specified by the DX register. Similarly, data in the AL register is output to the port specified in the DX register by execution of an "OUT DX, AL" instruction.

The standard UART used in the IBM PC is the 8250, or one of its compatible successors, the 16450or 16550. The standard ports in such UARTs are:

| Register | Offset | DLAB |
|---|---|---|
| Receiver Buffer Register (DAT) | 00h | 0 |
| Transmitter Hold Register (DAT) | 00h | 0 |
| Interrupt Enable Register (IER) | 01h | — |
| Interrupt Identification Register (IIR) | 02h | — |
| Data Format Register (Line Control Register) (LCR) | 03h | — |
| Modem Control Register (MCR) | 04h | — |
| Serialization Status Register (Line Status Register) (LSR) | 05h | — |
| Modem Status Register (MSR) | 06h | — |
| Scratchpad Register (SCR) | 07h | — |
| Divisor Latch Register, Low Byte (DLL) | 00h | 1 |
| Divisor Latch Register, High Byte (DLH) | 01h | 1 |
| DLAB = Divisor Latch Access Bit (Found in LCR) | | |

Data written to or read from each of these registers has a standard meaning, which is well known to the art. For example, a write to the transmitter hold register DAT will place a data byte in the transmitter hold register for later transmission over the serial line. As another example, the line status register LSR provides data bits such as a transmit hold register empty bit THRE, a transmit shift register empty bit TSRE, a break detection bit BRKI, a framing error bit FRMR, a parity error bit PARE, an overrun error bit ORRE, and receive data available bit RDRI.

A standard device driver similar to the CPQFMW31.386 126 module and the CPQFMW95.VXD 112 module would typically directly access these hardware registers at these I/O ports using input/output instructions. According to the invention, virtually the sole change to these virtual device drivers is that each "IN AL,DX" and "OUT DX,AL" instruction is replaced with a corresponding macro instruction "INALDX" and "OUTDXAL." These macros, when compiled, create a call to glue logic which simulates the register accesses to a 16450 UART. This logic is found in the SIM 450.C routine located in Appendix C, and is further described in detail below in conjunction with FIGS. 12A through 15. This glue logic accepts the identical parameters of the standard input and output instructions to a standard, physical UART and returns corresponding identical data. Therefore, a standard device driver that would normally access a hardware UART can be used, but instead through the SIM450.C virtual UART interface of the modem module 114.

Before turning to the operation of this virtual UART interface, a few other minor adaptations to the virtual device software modules 112 and 126 and the modem module 114 should be recognized. First, when the modem module 114 was previously implemented in its own dedicated microcontroller 40 of FIG. 2, it could essentially run continuously because the microcontroller 40 would have no have other functions. Because the modem module 114 is now implemented for execution by a CPU system that has other duties, however, the modem module 114 must instead relinquish control after it has carried out its necessary functions. This essentially requires little, other than to ensure that rather than going to a holding loop, the modem module 114 returns to the operating system.

Just as the modem module 114 must periodically return to the operating system, it must also periodically be called by the operating system to execute its desired functions. This is generally done through timer software within the operating system itself. That is, a standard timer device is requested to call the modem module 114 periodically so that it may carry out its desired functions. This is accomplished in two ways. First, the modem module 114 is periodically called by the timer. Second, because the DSP 58 will periodically request servicing by the modem module 114, it provides an interrupt to the VPICD.386 116 module, which in turn will cause both the modem module 114 and the virtual device module 112 or 126 to be serviced.

Modification to Standard UART Virtual Devices

Figure 9A:
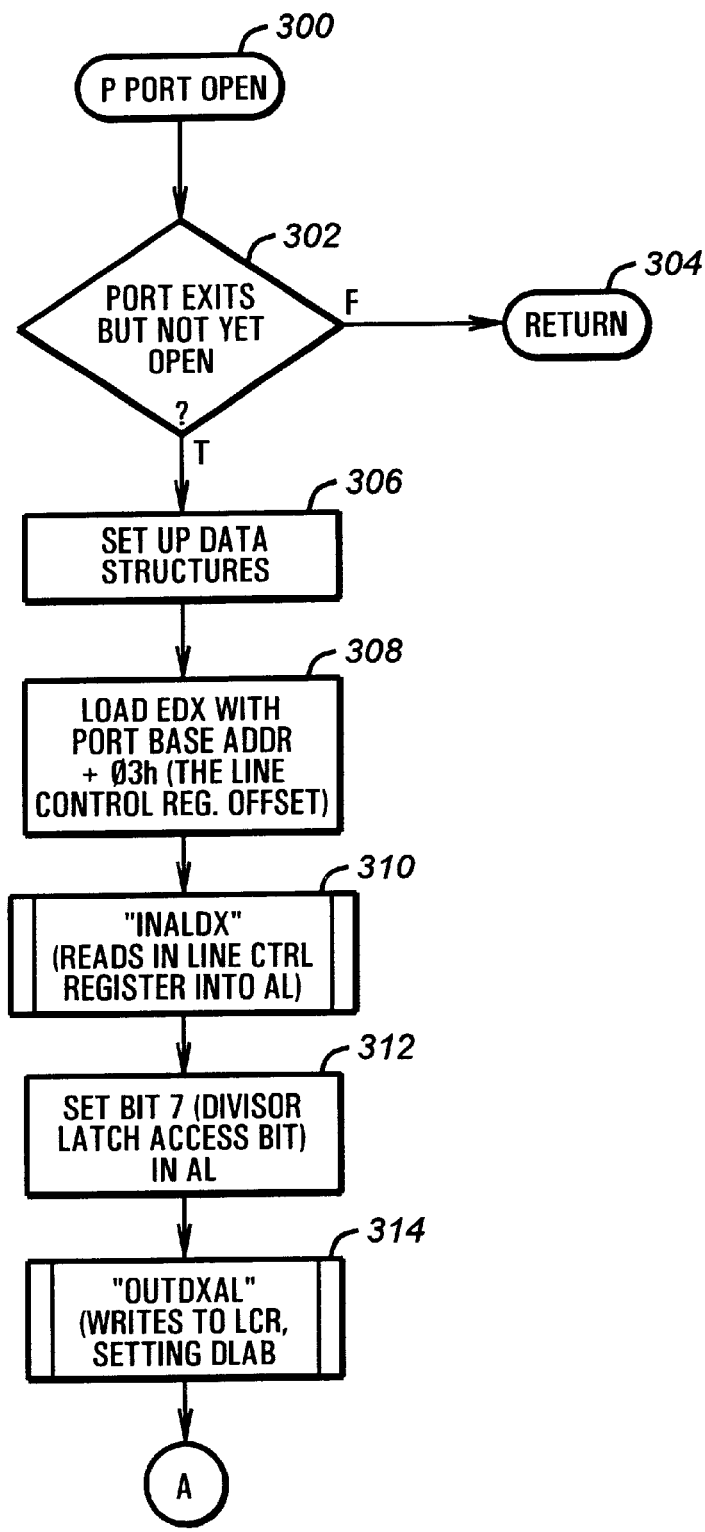
FIGS. 9A and 9B are a flowchart illustration of a PPORTOPEN routine that performs the "virtualized" input and output operations to a virtual UART according to the invention.
Figure 9B:
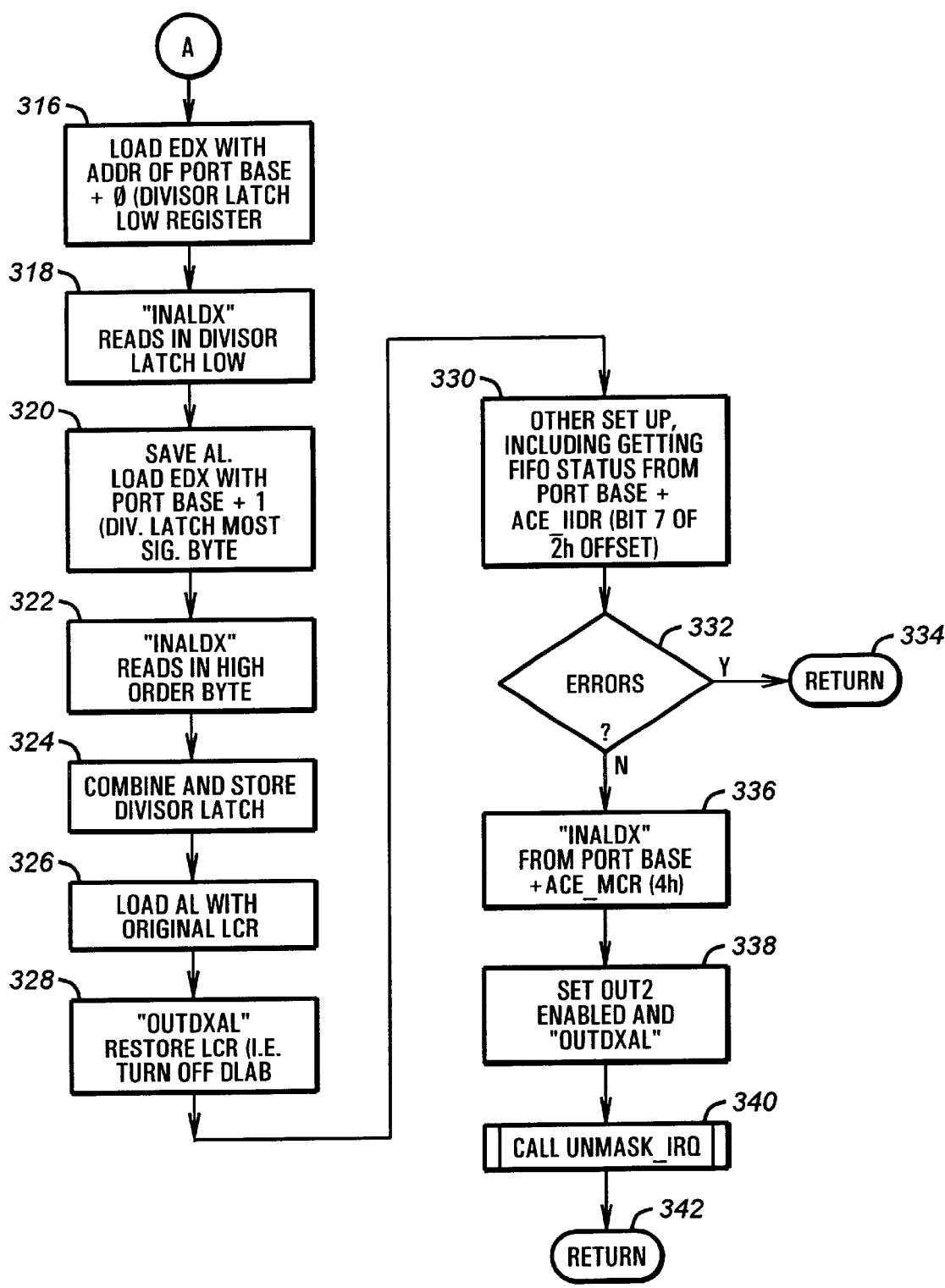

Turning to FIGS. 9A and 9B, these figures present an illustrative flowchart of how standard routines within the CPQFMW95.VXD 112 module go about accessing the modem module 114. A PPORTOPEN routine 300 is presented for illustration. This routine 300 would generally be called by other routines within the operating system software, such as the VCOMM.386 108 module and the CPQFMDB.VXD 110 module. Of course, numerous other routines exist within the CPQFMW95.VXD 112 module which are called by other routines in the operating system. These various modules access the UART to both send and receive data to and from a serial device and to control the UART. But this illustrative routine 300 is shown to illustrate how these physical calls are easily replaced with virtual calls.

Beginning at step 302, the routine 300 determines whether a port exists but has not yet been opened. If untrue, control proceeds to step 304, where the routine returns either because the port does not exist or because it is already opened. Otherwise, control proceeds from step 302 to step 306, where the data structures for the port are established. Then proceeding to step 308, the EDX register is loaded with the port base address of the serial port desired to be opened plus an offset of 03 h. This offset corresponds to the line control register LCR port offset for a standard 8250, 16450, or 16550 UART. Thus, the EDX register now has the appropriate port address for an input from the LCR port.

Proceeding to step 310, an "INALDX" routine 350 is executed. As is discussed below in conjunction with FIG. 10, this routine 350 is actually preferably a macro that forms expanded in-line code to call the appropriate glue logic in the virtual UART interface, which in turn calls the modem module 114. In step 310, the "INALDX" macro performs the precisely same function as if the line control register LCR of a physical UART had been read from using an "IN AL,DX" instruction of an x86 processor. More specifically, the AL register now contains the data input from the "virtual" line control register LCR. Proceeding to step 312, the high order bit of the AL register is set, which corresponds to the divisor latch access bit DLAB of the line control register LCR, and then proceeding to step 314, a corresponding "OUTDXAL" macro is executed, which sets the DLAB within the line control register LCR of the "virtual" UART according to the invention. Control then proceeds to step 316, where the EDX register is loaded with the base port address plus 00 h, which corresponds to the divisor latch low byte register DLL. At step 318, the INALDX macro is executed, reading in the divisor latch low order byte DLL from the virtual UART. At step 320, the AL register is saved, and the EDX register is loaded with the base port address plus 01 h, which corresponds to the divisor latch high byte DLH. Proceeding to step 322, this byte is read in using the INALDX macro. Then proceeding to step 324, the low and high order bytes of the divisor latch are combined and stored. At step 326, AL is loaded with the original line control register LCR input value. Then proceeding to step 328, the OUTDXAL macro is executed, restoring the line control register LCR to its original value—i.e., the DLAB is disabled if originally disabled. Then proceeding to step 330, other setup is executed.

The point of this sequence of instructions is that the virtual UART located within the modem module 114 is accessed identically as though it were a real UART. The preceding sequence has been executed to set the divisor latch to an appropriate value, which effectively sets the baud rate. It must be appreciated that there is effectively no "baud rate" in the virtual UART because data is virtually instantaneously transferred between the modem module 114 and whatever device driver is calling that software through the virtual UART. But standard UART device drivers expect to be able to set and access the baud rate, so the virtual UART provides access to virtual divisor latch bytes, even if they really do not do anything. In this way, existing hardware UART device drivers are easily modified for use with the virtual UART of the modem module 114.

To complete the routine, control then proceeds to step 332, where if errors are detected, control proceeds to step 334 where the routine returns. If there were no errors, control instead proceeds from 332 to step 336, where the port base address plus the appropriate offset for the modem control register MCR is input. Then the OUTZ bit of that data is enabled and is output using the OUTDXAL macro at step 338. Control then proceeds to step 340, where a call is made to unmask the interrupt request line IRQ. As discussed below, the virtual UART also causes "virtual" interrupts to invoke an appropriate operating system interrupt service routine. Proceeding from step 340, control then returns at step 342.

Figure 10:
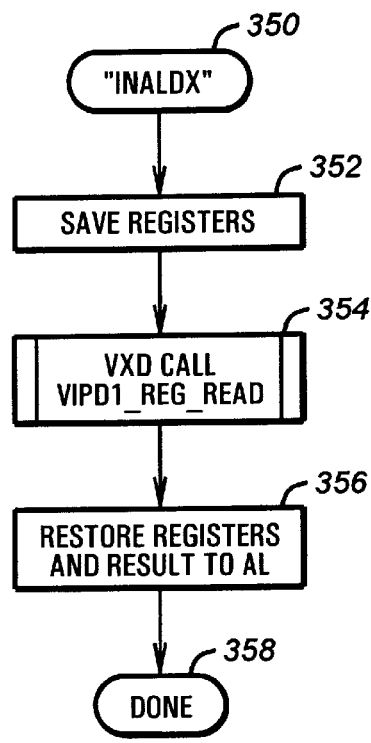
FIG. 10 is a flowchart illustration of macro in-line code to be generated for "virtual" input and output operations.
Figure 10:
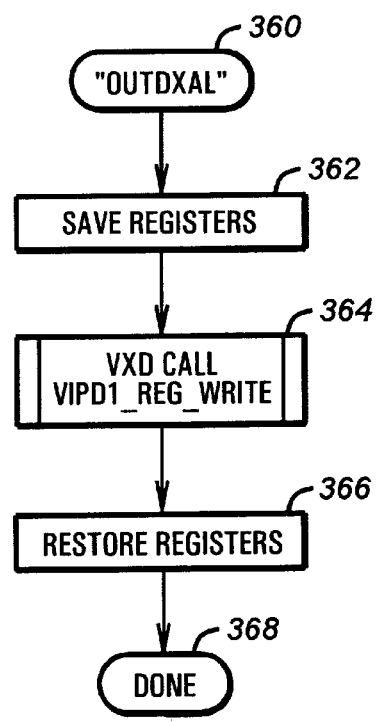

Turning to FIG. 10, the two macro routines INALDX 350 and OUTDXAL 360 are shown. The INALDX routine 350 substitutes for the standard IN AL,DX instruction on the x86 series of microprocessors, while the OUTDXAL routine 360 correspondingly substitutes for the OUT DX,AL instruction. These are not callable routines, but are instead macros, which are assembled in-line in the CPQFMW95.VXD 112 module, the CPQFMDB.VXD 110 module, and the corresponding routines in FIG. 6. The INALDX routine 350 and the OUTDXAL routine 360 in effect substitute a call to glue logic for the standard input/output instructions.

The INALDX routine 350 begins at step 352, where it saves any registers that will be changed. Proceeding to step

354, a virtual device driver call is made to a glue routine VIPD1_REG_READ. This routine, further discussed below in conjunction with FIG. 11, strips the physical address off of the DX register, leaving an offset, and then calls the virtual UART routines discussed below in conjunction with FIGS. 12A–15.

Proceeding to step 356, the registers are restored and the result of the call at step 354 is stored in the AL register. Then, at step 358, the in-line macro is done so other code continues to execute.

The OUTDXAL routine 360 works in a similar way, beginning at step 362, where it stores the registers. Control then proceeds to step 364, where a glue logic routine (see FIG. 11) is called, specifically VIPD1_REG_WRITE. Control next proceeds to step 366, where the register is restored, with the routine completing at step 368.

It will be appreciated that if the INALDX routine 350 and the OUTDXAL routine 360 were simply replaced with the appropriate I/O operation, then the various device drivers would operate normally in conjunction with a hardware UART with virtually no changes.

Figure 11:
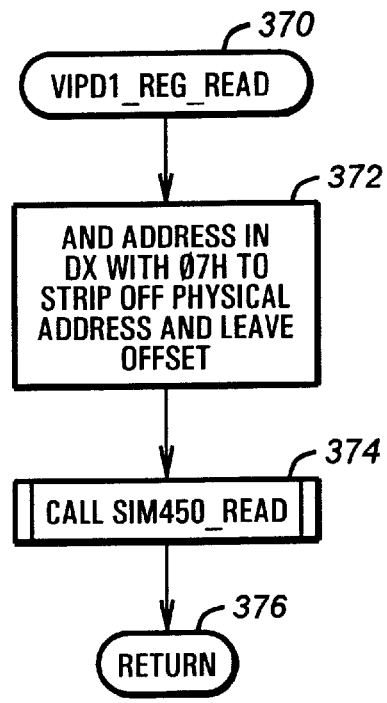
FIG. 11 is a flowchart illustration of code called by the macros of FIG. 10.
Figure 11:
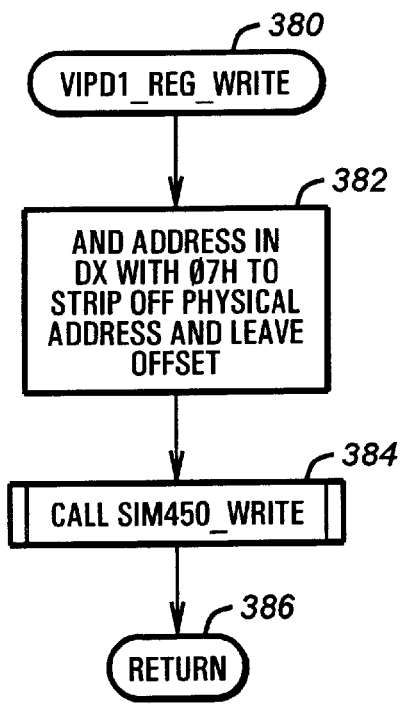

Turning to FIG. 11, shown are the VIPD1_REG_READ routine 370 and the VIPD1_REG_WRITE routine 380. These routines, called at steps 354 and 364 of FIG. 10, are in effect glue logic for bridging between the virtual UART of the modem module 114 and the remainder of the operating system. The VIPD1_REG_READ routine 370 begins at step 372, where it performs a binary AND operation of the address in the DX register with 07 h, stripping off the physical address and leaving an offset to the appropriate port of a standard UART.

Proceeding to step 374, the VIPD1_REG_READ routine 370 calls a routine SIM450_READ 400. The SIM450_READ routine 400 of the virtual UART simulates a read from a port of a 16450 UART. This routine 400 performs a "read" from the appropriate "port" of the virtual UART. Proceeding to step 376, the VIPD1_REG_READ routine 370 returns to the macro in-line code of the INALDX routine 350 (FIG. 10) that called it.

The VIPD1_REG_WRITE routine 380 operates in a similar manner. Beginning at step 382, the address is stripped off the DX register by a binary AND operation with 07 h. Then, proceeding to step 384, a SIM450_WRITE routine 500 is called, which performs a "write" to the virtual UART's "ports." Then proceeding to step 386, the VIPD1_REG_WRITE routine 380 returns to the OUTDXAL routine 360 in-line code (FIG. 10) that called it.

The VIPD1_REG_READ routine 370 and VIPD1_REG_WRITE routine 380 are found in the source code of Appendix C. The INALDX routine 350 and the OUTDXAL routine 360 are found as a macro in, for example, the source code of Appendix A. All of these flowcharts are illustrative, and further details can be found within the source code appendices.

The Virtual UART Read and Write Routines

Figure 12A:
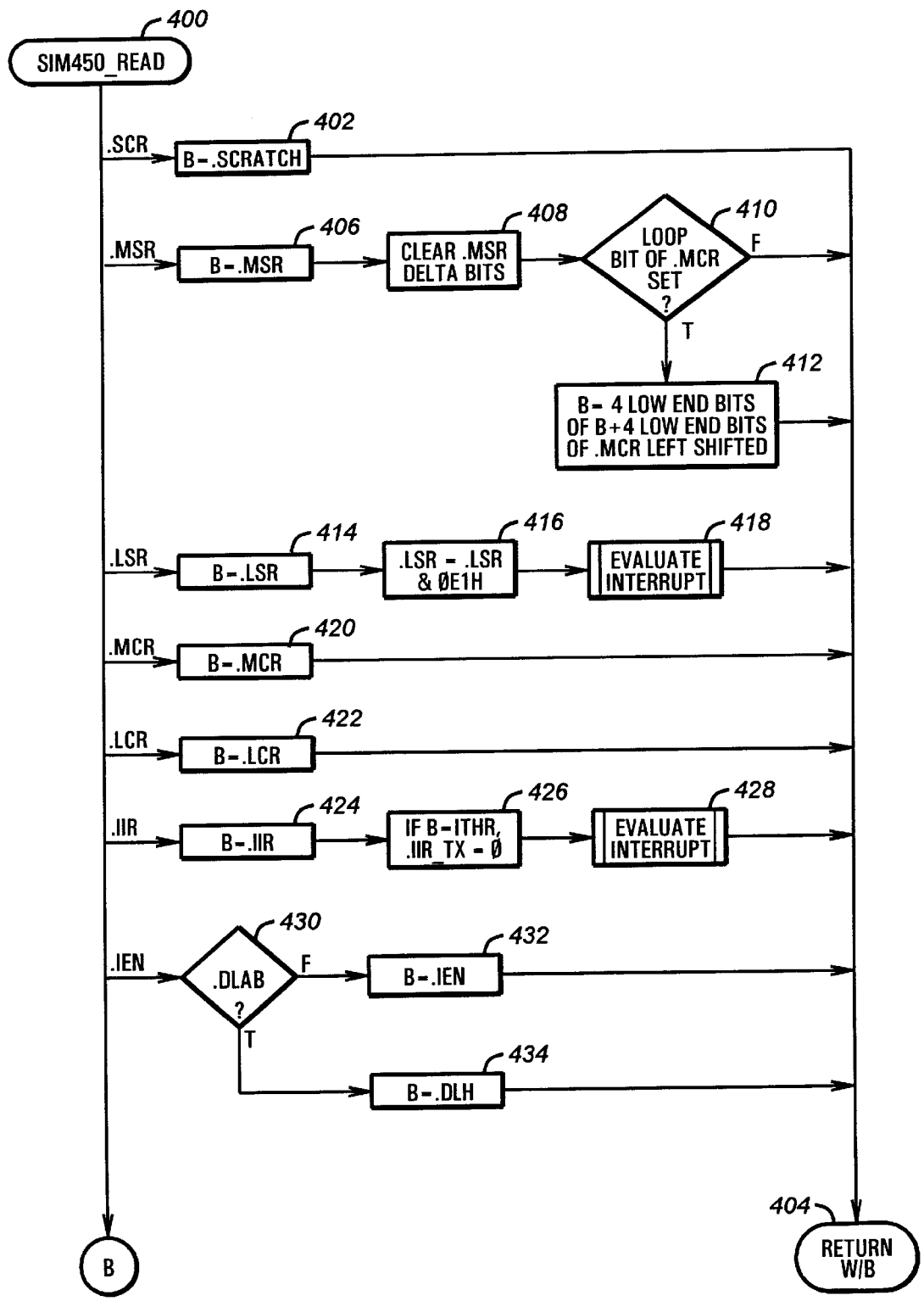
FIGS. 12A and 12B are a flowchart illustration of a SIM450_READ routine to be executed on calls to the virtual UART.
Figure 12B:
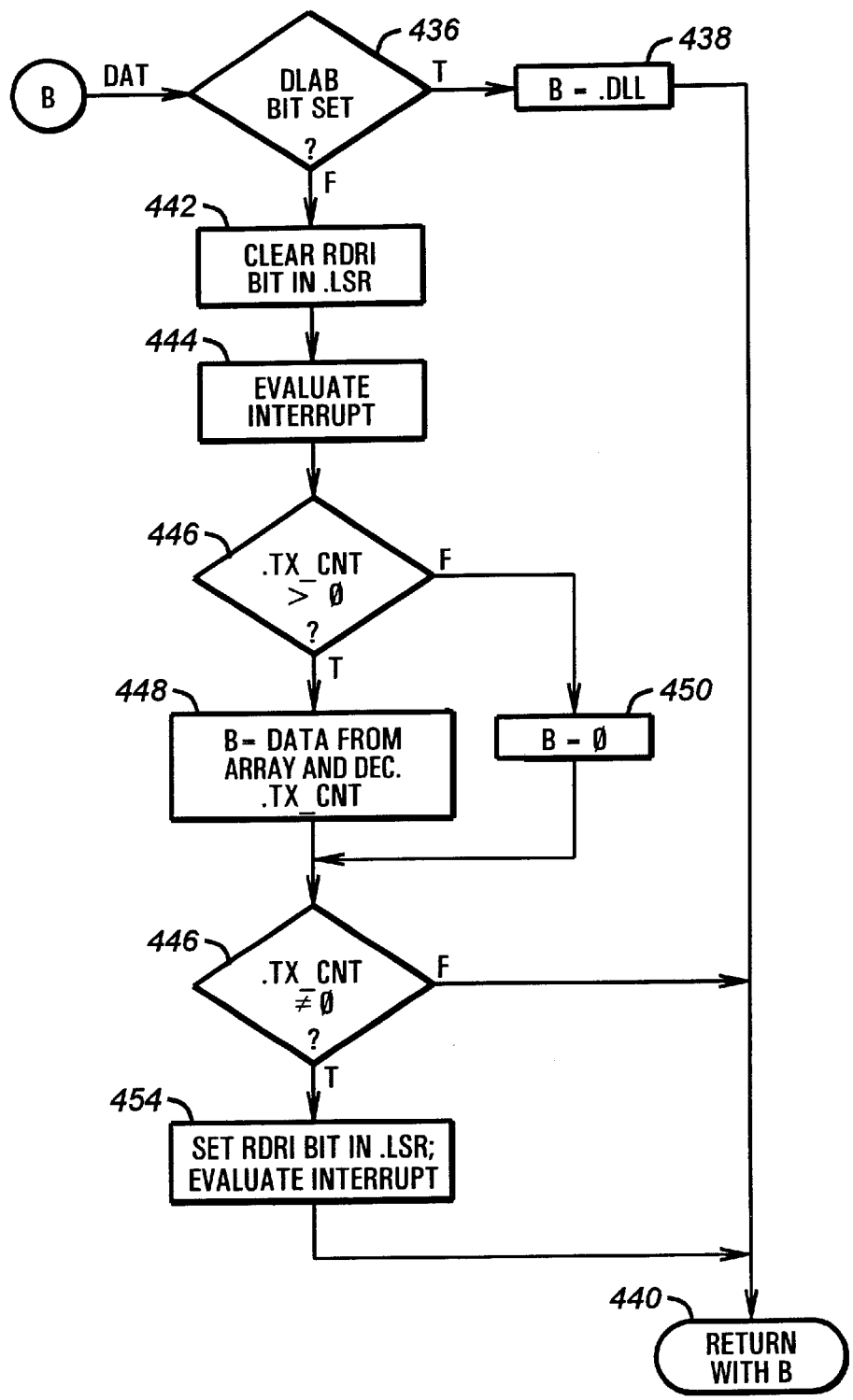

Turning to FIGS. 12A and 12B, shown is the SIM450_READ routine 400, called at step 374 of the VIPD1_REG_READ routine 370 (FIG. 11). Before turning to the details of the SIM450_READ routine 400, a few notational conventions. Data local to the SIM450_READ routine 400 is generally stored in a structure, which can be found within the source code of that routine, located in the SIM450.C and SIM450.H modules attached as source code listings attached as Appendix C. The primary data structure is the SIM450_DATA structure, in which variables are stored in a structure using conventional C-programming notation. For example, the contents of the "virtual" scratchpad register are found in the SIM450_DATA.SCRATCH variable. Rather than list "SIM450_DATA" as the preface to each reference to that data structure, a shorthand notation is used so the SIM450_DATA.SCRATCH variable becomes simply the .SCRATCH variable.

Further, for clarity, certain details have been omitted from the flowchart of the SIM450_READ routine 400. Specifically, the SIM450_READ routine 400 communicates with the modem module 114 through a series of calls that are implemented within the modem module 114 itself. The modem module 114 includes a number of "hooks" which allow it to communicate in a variety of ways with different types of software interfaces. In this way, referring back to FIG. 2, the modem module 114 can be implemented in the microcontroller 40 and communicate with a UART 46, or instead communicate with a variety of other types of devices through its glue routines. The "hooks" for the modem module 114 include a number of software calls that both set up a variety of control parameters and send and receive data. In general, the data is sent to and received from the data arrays maintained by the SIM450.C module itself. Rather than discussing each of these routines in detail, a few of these routines will generally be discussed to describe how they interface with the SIM450.C module.

As would be appreciated by one skilled in the modem arts, the modem module 114 will typically include code for both communicating data received and transmitted over the phone line to and from the SIM450 code, but will also include control software that implements the standard Hayes "AT" command set. That is, when the modem module 114 is in a transmit and receive mode, actual data will be transmitted over and received from the telephone line. That mode is typically exited by a user entering three "+++" characters in a row, the standard "AT" escape sequence, which causes the modem module 114 to enter a control mode. In that mode, the modem module 114 responds to "AT" commands from the computer itself, but does not communicate data over the telecommunications link.

One type of communication mode implemented by the modem module 114 is a flow control mode, in which either software codes are used to start and stop the transmission of data to the modem module 114, or a hardware flow control model is used. In the latter case, the clear to send bit CTS and ready to send bit RTS are used to indicate whether data can be sent or received. This code is not illustrated in the flowcharts of the SIM450.C code, but is found within the SIM450.C code attached in Appendix C. One would readily appreciate how this code is incorporated.

The SIM450_READ routine 400 is executed as a series of case statements. The first case starts at step 402, to which control passes when the called value corresponds to the offset of the scratchpad register SCR. In standard UARTs, this corresponds to a port offset of 07 h. If so, a temporary variable B is loaded with the contents of the SCRATCH variable. Control then proceeds to step 404, where the routine returns with the contents of the B variable as a parameter.

So that the operation of the simulated UART can be better understood, briefly consider FIGS. 9A, 9B, 10, 11, and 12 in conjunction with a read of the scratchpad register. Suppose that the INALDX routine 350 is executed with the DX register containing the address of the desired port base plus the offset of 07 h corresponding to the scratchpad register SCR. The INALDX routine 350 then calls the VIPD1_REG_READ routine 370 at step 354, which in turn strips off all but the offset of 07 h and calls the SIM450_READ routine 400 at step 374. Then, the data in the .SCRATCH variable is loaded into the variable at step 402, which is returned at step 404. This data is then stored in the AL register in step 356 of the INALDX routine 350. Thus, the "virtual" scratchpad register SCR has been "read."

The remainder of the standard registers can be similarly read. The SIM450_READ routine 400 proceeds to step 406 when the offset corresponds to the modem status register MSR. In that case, at step 406, the B variable is loaded with the contents of the modem status register variable .MSR, which contains the contents of the virtual UART's MSR register. Proceeding to step 408, the delta bits of the .MSR variable are cleared. These bits are the lower four bits of the .MSR variable, which correspond to bits used in a standard UART to detect whether the data carrier detect (DCD), ring indicator (RI), data set ready (DSR), or clear to send (CTS) bits (all found in the four high order bits of the .MSR variable) have changed since the last time the .MSR variable has been read. It will be appreciated that this simulates the functioning of a standard UART.

Proceeding to step 410, the LOOP bit of a modem control register variable .MCR is tested. If this bit is true, then the virtual UART is in a loop back mode, a standard form of operation for a 16450 UART. If not set, control proceeds to step 404, where the SIM450_READ routine 400 returns with the contents of the .MSR variable. If the LOOP bit of the .MCR variable is true at step 410, control instead proceeds to step 412, where the four low order bits of the .MSR variable, contained in the B variable, and the four low order bits of the .MCR variable, left shifted, are stored in B. When the LOOP bit of the .MCR variable is set, this is the appropriate value to be returned on a read of the modem status register MSR in a standard UART, so that value is then returned at step 404.

Control proceeds from step 400 to step 414 on a read from the line status register LSR, the B variable is loaded with the contents of the line status register variable .LSR at step 414, and control proceeds to step 416, where the .LSR variable is loaded with the contents of the .LSR variable AND'd with 0E1h, masking appropriate bits to clear parity error, overrun error, and frame error bits. Control then proceeds to step 418 where an EVALUATE_INTERRUPT routine 600 is called (FIGS. 14A and 14B), and then the routine 400 returns at step 400.

The EVALUATE_INTERRUPT routine 418 evaluates whether a virtual "interrupt" should be executed. A virtual interrupt is initiated by a call to an interrupt service routine located within the various device drivers of FIGS. 5 and 6. There will of course be a standard interrupt service routine for use by a true hardware interrupt from a UART, and this same service routine is therefore called should a "virtual" interrupt be necessary. The EVALUATE_INTERRUPT routine 600 is called at appropriate times when it may be necessary to initiate such a virtual interrupt. For example, when the line status register LSR of a standard UART is read, if additional data is available and interrupts are enabled, an interrupt will be executed indicating that the additional data is in fact available. This is an instance when interrupts should at least be evaluated to determine if one should be executed, which the EVALUATE_INTERRUPT routine 600 does.

Control proceeds from step 400 to step 420 if the modem control register MCR is to be read. At step 420, the B variable is loaded with the contents of the modem control variable .MCR, and control returns at step 404. Similarly, control proceeds from step 400 to step 422 if the line control register LCR is to be read. At step 422, the B variable loaded with the contents of the line control variable .LCR. Control then returns the contents of B at step 404.

Step 424 is entered from step 420 if the interrupt identification register IIR is to be read. At step 424, the B variable is loaded with the contents of an interrupt identification variable .IIR. Control then proceeds to step 426, where if the B variable (now containing the contents of the .IIR variable) is compared to a constant ITHR, which corresponds to a pending interrupt caused by the transmit hold register being empty. If equal, then this interrupt should be cleared because a read from the interrupt identification register IIR should clear this type of interrupt. To do this, a pending transmit empty interrupt variable .IIR_TX is loaded with zero, which will clear this interrupt in the EVALUATE_INTERRUPT routine 600, which is then called at step 428. Control then returns at step 404.

Step 430 is entered from step 400 if the interrupt enable register IEN is to be read. At step 430, it is first determined whether the divisor latch access bit DLAB is set by examining a divisor latch access bit variable .DLAB, which represents the contents of the DLAB bit of the line control register LCR. If it is not set, then control proceeds to step 432, where the B variable is loaded with the contents of interrupt enable variable .IEN. This is because when the divisor latch access bit DLAB is not set, a read from the IEN register is to return the normal interrupt enable values of that register. Control then proceeds to step 404 where that value is returned.

If at step 430 the DLAB is set, control instead proceeds to step 434, where the B variable is loaded with the contents of a divisor latch high variable .DLH. This variable is used for baud rate determination, and in the disclosed embodiment, is strictly maintained so that the virtual UART appears the operating system to be a standard hardware UART. Again, this is because the "baud rate" of the virtual UART is effectively however fast the processor can run—the virtual UART is not artificially "slowed down" to the baud rate of a normal UART (although it could be). Control then proceeds to step 404 where the high byte of the divisor latch is returned.

Turning to FIG. 12B, the last option to be entertained from step 400 is a read from the DAT port, which indicates data should be read from the receive buffer of the virtual UART or from the divisor latch, depending on the setting of the DLAB. This aspect is handled at step 436, where it is determined whether the DLAB is set. If so, control proceeds to step 438, where the B variable is loaded with a divisor latch low variable .DLL. Because the divisor latch access bit is true, this is the appropriate action. Control then proceeds to step 440, where the SIM450_READ routine 400 returns with the value loaded in the B variable.

From step 436, if the DLAB is not set, control instead proceeds to step 442, which is the beginning of a sequence in which receive data, if available, will be read from the virtual UART as implemented in the SIM450.C code. At step 442, a receive data ready bit RDRI is cleared in line status register variable .LSR. This is done because the data will be read from the receiver buffer in the following steps. If there is more receive data available, the RDRI register will be subsequently set, but this read initially clears that RDRI bit. Proceeding to step 444, the EVALUATE_INTERRUPT routine 600 is called to determine whether an interrupt should be initiated to the operating system. An interrupt would occur, for example, if more data is available.

Proceeding to step 446, it is determined whether the amount of data in the transmit buffer from the modem module 114 is greater than zero. If so, this indicates data is present from the modem module 114 to read; if not, this indicates that no data is available from the modem module

114. If a modem transmit buffer count variable .TX__CNT is greater than zero, control proceeds to step 448, where the B variable is loaded with data from the modem's transmit array, where the transmit array contains data transmitted from the modem module 114. Further, the .TX__CNT variable is decremented to indicate that the data has been read from the transmitter from the modem module 114.

From step 446, if the transmit count variable .TX__CNT is not greater than zero, this indicates that no data is available from the modem module 114, so control proceeds to step 450, where the B variable is loaded with the NULL character, or zero. From both steps 448 and 450, control then proceeds to step 452.

At step 452, if the .TX__CNT variable is not equal to zero, indicating that more data is available from the modem module 114, control proceeds to step 454, where the receive data ready indicator bit RDRI in the line status register variable .LSR is set, and interrupts are evaluated by a call to the EVALUATE__INTERRUPT routine 600. From step 452 if the .TX__CNT variable is equal to zero, and from step 454 in any case, control proceeds to step 440.

Figure 13A:
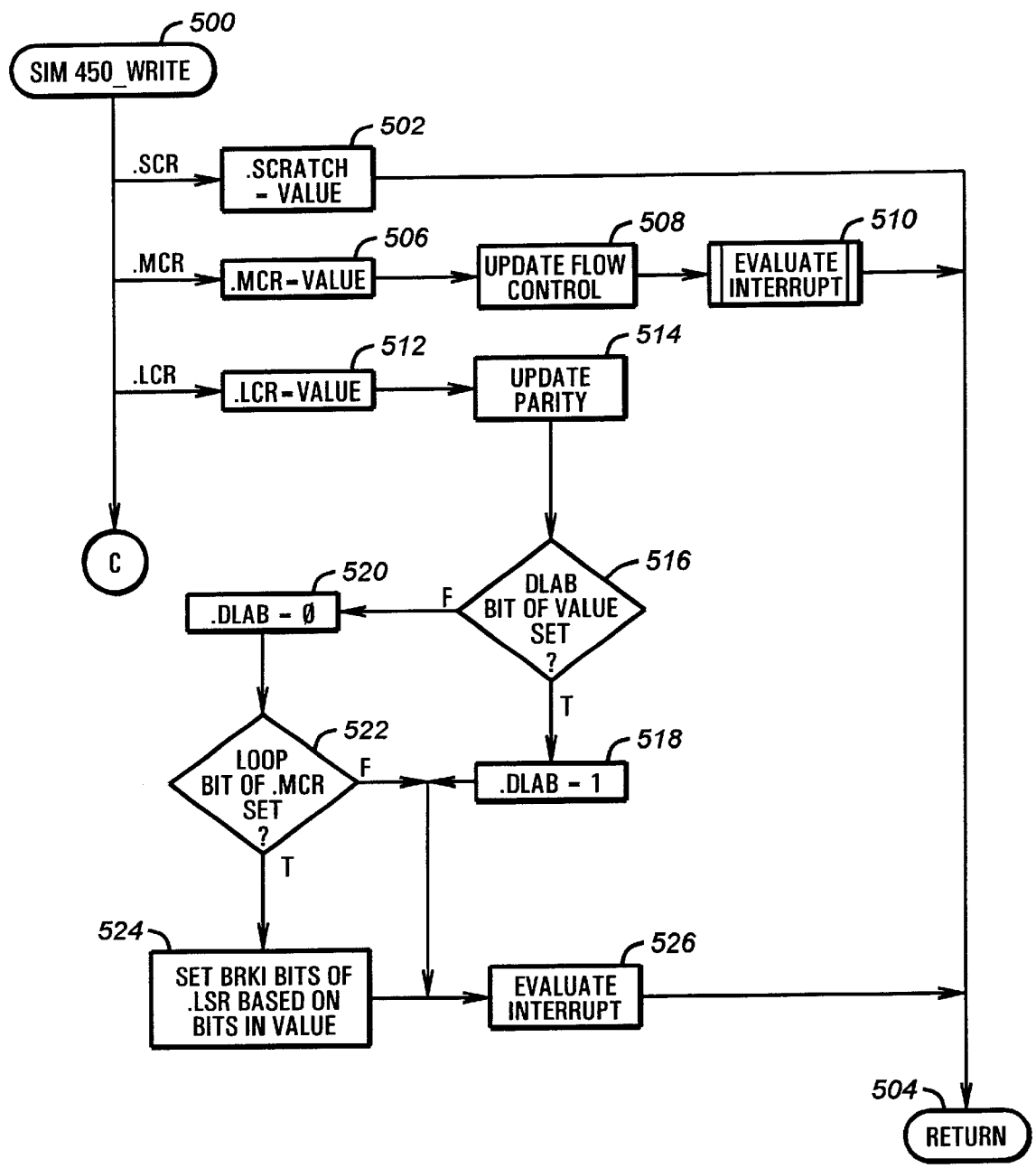
FIGS. 13A–13C are a flowchart illustration of a SIM450_WRITE routine to be executed on calls to the virtual UART.
Figure 13B:
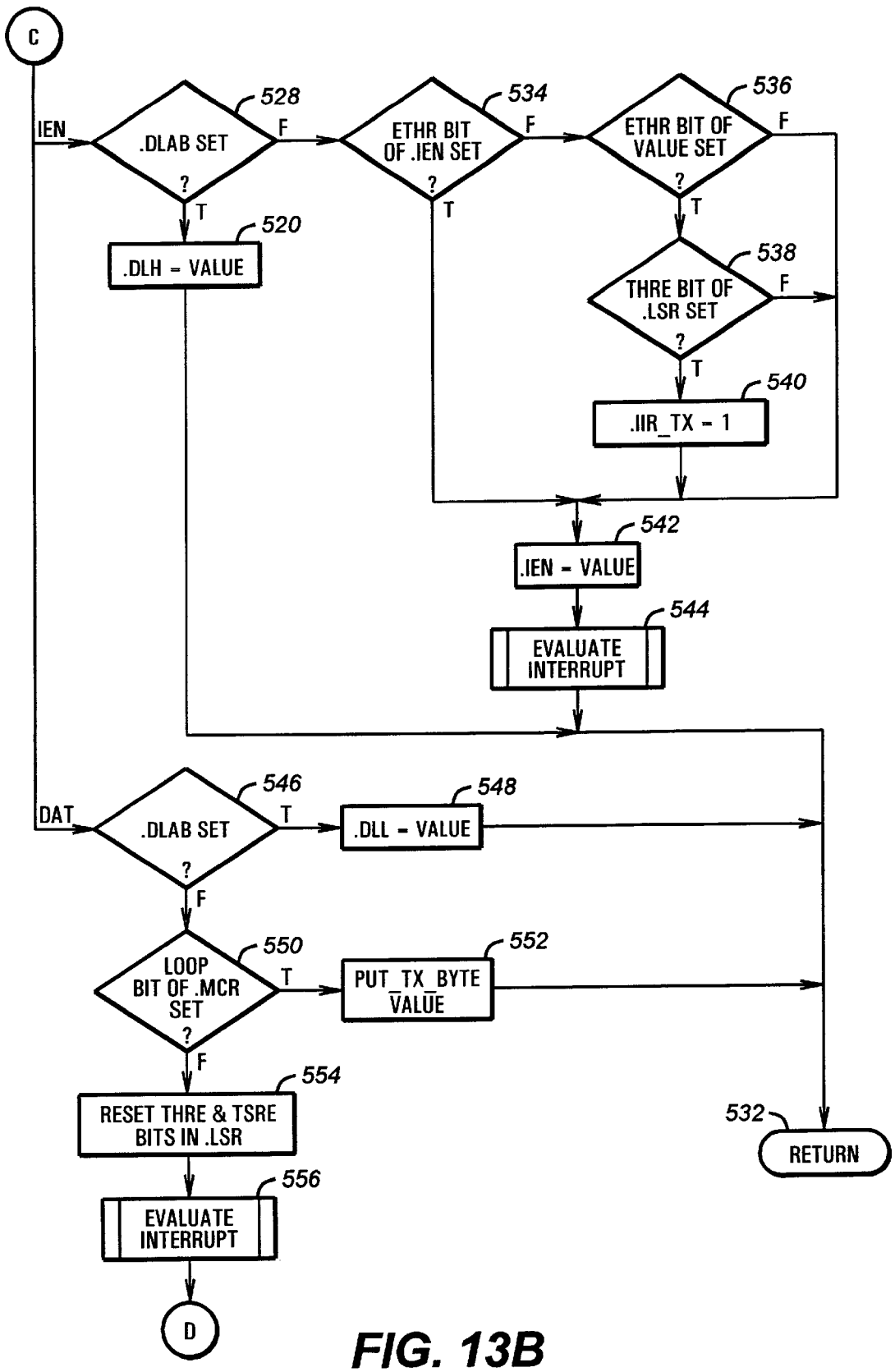
Figure 13C:
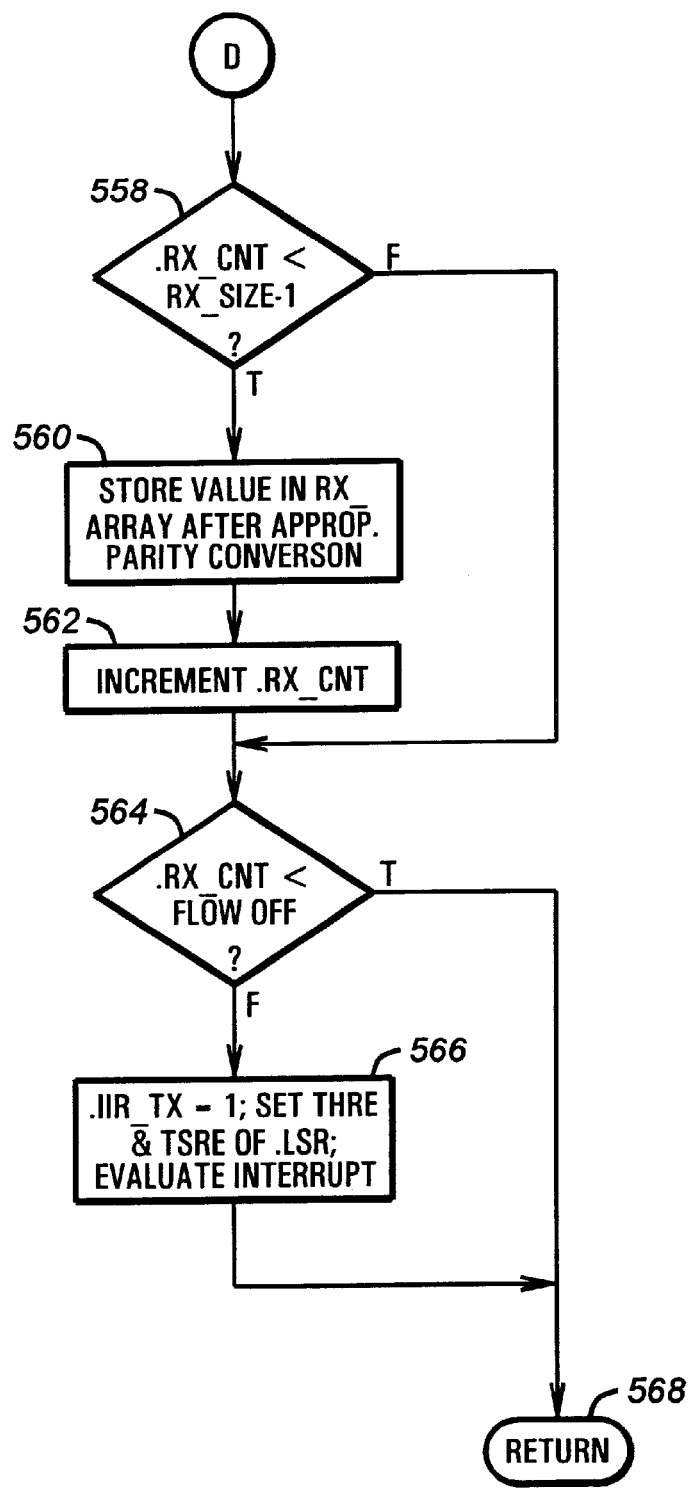

Turning to FIGS. 13A–13C, the flowchart of the SIM450__WRITE routine 500 is shown. The source code for this routine is also found in the SIM450.C source code listing in Appendix C. Again, certain details regarding flow control have been omitted for clarity. Generally, however, whenever a virtual device driver would execute an output to a hardware port on a corresponding hardware UART, the SIM450__WRITE routine 500 is instead called.

This routine 500 is also shown in the form of a case statement. If the selected port offset corresponds to the scratchpad register SCR, control proceeds to step 502, where the .SCRATCH variable is set equal to a VALUE variable, a parameter passed in the AL register as illustrated in the OUTDXAL macro 360 of FIG. 10. Control proceeds from step 502 to step 504, where the SIM450__WRITE routine 500 returns to its calling routine, here shown to be the VIPD1__REG__WRITE routine 380.

On a write directed to the modem control register MCR, control proceeds from step 500 to step 506, where the modem control register variable .MCR is set equal to the VALUE parameter. Control then proceeds to step 508, where flow control is updated. This is necessary because the modem control register variable MCR includes a number of bits, such as OUT2*, OUT1*, RTS*, DTR* and other modem controls that could affect flow control.

Proceeding to step 510, the SIM450__WRITE routine 500 calls the EVALUATE__INTERRUPT routine 600. This is done because it may be necessary to initiate an interrupt to the operating system driver code because of changes in the value of the .MCR variable. Control then returns at step 506.

If the I/O write was intended for the line control register LCR, control proceeds from step 500 to step 512. At step 512, the .LCR variable is loaded with the VALUE parameter, and control then proceeds to step 514, where any parity processing tables are updated. This is because three bits within the .LCR variable are directed to parity settings of no parity, odd parity, even parity, mark parity, or space parity.

From step 514, control proceeds to step 516, where it is determined whether the DLAB bit located in the VALUE variable is set. If true, then the .DLAB variable is set equal to one at step 518. If false, control proceeds to step 520, where the .DLAB variable is set to zero. Thus, the .DLAB variable reflects the current value of the DLAB bit within the .LCR variable. From step 520, control proceeds to step 522, where it is determined whether the LOOP bit of the .MCR variable is set. If so, we are in loop back mode, so control proceeds to step 524, where the BRKI bit of the .LSR register is set to true if the SBRK bit of VALUE is true, and otherwise, the BRKI bit of the .LSR register is left unchanged. That is, if the virtual UART is in loop back mode, then the break input bit of the virtual UART is set to correspond with the break output bit of the virtual UART.

From steps 518, 522, and 524, control then proceeds to step 526, where the EVALUATE__INTERRUPT routine 600 is called to determine if a UART interrupt should be executed by the operating system.

Continuing in FIG. 13B, other conditions are shown. If the write corresponds to a write to the UART interrupt enable register IEN, control proceeds from step 500 to step 528, where it is first determined if the .DLAB variable is set to true. If so, control proceeds to 530, where the divisor latch high byte variable .DLH is set equal to the VALUE parameter. This is done because when the DLAB bit is set, the divisor latch is accessed by reads from and writes to the IEN register and the DAT register. Control then proceeds from step 530 to step 532, where control returns to the calling routine.

From step 528, if the .DLAB variable is not true, control proceeds to step 534, where the empty transmit hold register bit ETHR of the interrupt enabler register .IEN is tested. This bit, when true, indicates an interrupt should occur when the transmit hold register (i.e., DAT) is empty. If this bit is not set, control proceeds to step 536, where the ETHR bit of the VALUE parameter is tested, and if true, control proceeds to step 538. At step 538, the transmit hold register empty bit THRE is tested in the line status register variable .LSR. If set, this indicates that a transmitter interrupt should occur, because the interrupts based on the transmit hold register being empty have just been turned on, and the transmit hold register is in fact empty. So, control proceeds from step 538 to step 540, where the interrupt pending interrupt identification register transmit variable .IRR__TX is set to one, or true.

On all other conditions from steps 534 to 538 and from step 540, control proceeds to step 542, where the interrupt identification register variable .IEN is set equal to the VALUE parameter. Control then proceeds to step 544 where the EVALUATE__INTERRUPT routine 600 is called. If step 540 was reached, indicating an interrupt should occur based on the transmit hold register being empty and interrupts on transmit hold register empty having been turned on, then this will cause an interrupt to the operating system software in the EVALUATE__INTERRUPT routine 600. From steps 530 and 544, control proceeds to step 532, where a return is executed.

If the UART register to be written is the transmit data register DAT, control proceeds from step 500 to step 546, where the divisor latch access bit variable .DLAB is tested. If true, then the divisor latch low byte variable .DLL is loaded with the VALUE parameter at step 548, and then control returns at step 532.

If the .DLAB variable is not set at step 546, control proceeds to step 550, where the LOOP bit of the modem control register variable .MCR is tested. If it is set, indicating we are in loop back mode, control proceeds to step 552 where a put byte into modem module transmit buffer routine PUT__TX__BYTE 700 is executed, discussed further below in conjunction with FIG. 15. It must be understood that the PUT__TX__BYTE routine 700 corresponds to a byte being placed into the transmit buffer from the modem module 114 to the virtual UART. Thus, when a byte is placed in that transmit buffer, it is actually received by the virtual UART. This is appropriate at step 552, because the data to be written should actually be read by the UART in loop back mode. Control proceeds from step 552 to step 532, where it returns to the calling routine.

From step 550, if we are not in loop back mode, control proceeds to step 554, where the transmit hold register empty bit THRE and the transmit shift register empty TSRE in the line status register variable .LSR are reset, because we are presently providing a byte of data to be written in those registers. Control then proceeds to step 556, where the EVALUATE_INTERRUPT routine 600 is called. From step 556, control proceeds to step 558 (FIG. 13C), where it is determined whether a modem module receiver buffer counter .RX_CNT is less than a maximum value. If so, this indicates that receiver buffer of the modem module 114 still has room to receive another byte from the virtual UART— that byte having been output by the OUTDXAL macro that has resulted in the routine reaching step 558. Therefore, control proceeds to step 560, where the VALUE parameter is stored in the modem module 114 receiver array RX_ARRAY after an appropriate parity conversion based on the present parity settings of the virtual UART.

Control then proceeds to step 562 where the .RX_CNT variable is incremented, reflecting the addition of data to the receiver array. From step 558, if the .RX_CNT variable has exceeded the maximum buffer size, or from step 562 in any case, control proceeds to step 564, where it is determined whether the .RX_CNT variable is less than a flow-off condition. If false, this means that the virtual devices of the operating system should be stopped from sending any more data until the modem module 114 has processed that data. Referring above to step 554, there the transmit hold register empty bit THRE and transmit shift register empty bit TSRE were reset within the line status register variable .LSR at step 554. Therefore, until those bits are set, the virtual device drivers in the operating system should not write to the UART, because when they read the LSR variable through the SIM450_READ routine 40, these bits will indicate full transmit buffers. Therefore, if the modem module 114 receive array is full, these bits are left unchanged, as control proceeds from step 564 to step 568, where a return is executed.

Otherwise, control proceeds from step 564 to step 566, where appropriate action is taken to allow additional data to be written through the virtual UART into the modem module 114 receive buffer. First, the interrupt identification register transmit variable .IRR_TX is set to true, indicating that an interrupt should occur, if necessary, showing the transmit buffers are clear for more data. The transmit hold register empty bit THRE and the transmit status register empty bit TSRE of the line status register variable .LSR are set to true, indicating these registers are empty and available for accepting data from the operating system. Then the EVALUATE_INTERRUPT routine 600 is called so that an appropriate interrupt can be triggered to the operating system. From step 566, control proceeds to step 568, where it returns to the calling routine.

Virtual Interrupts

Figure 14A:
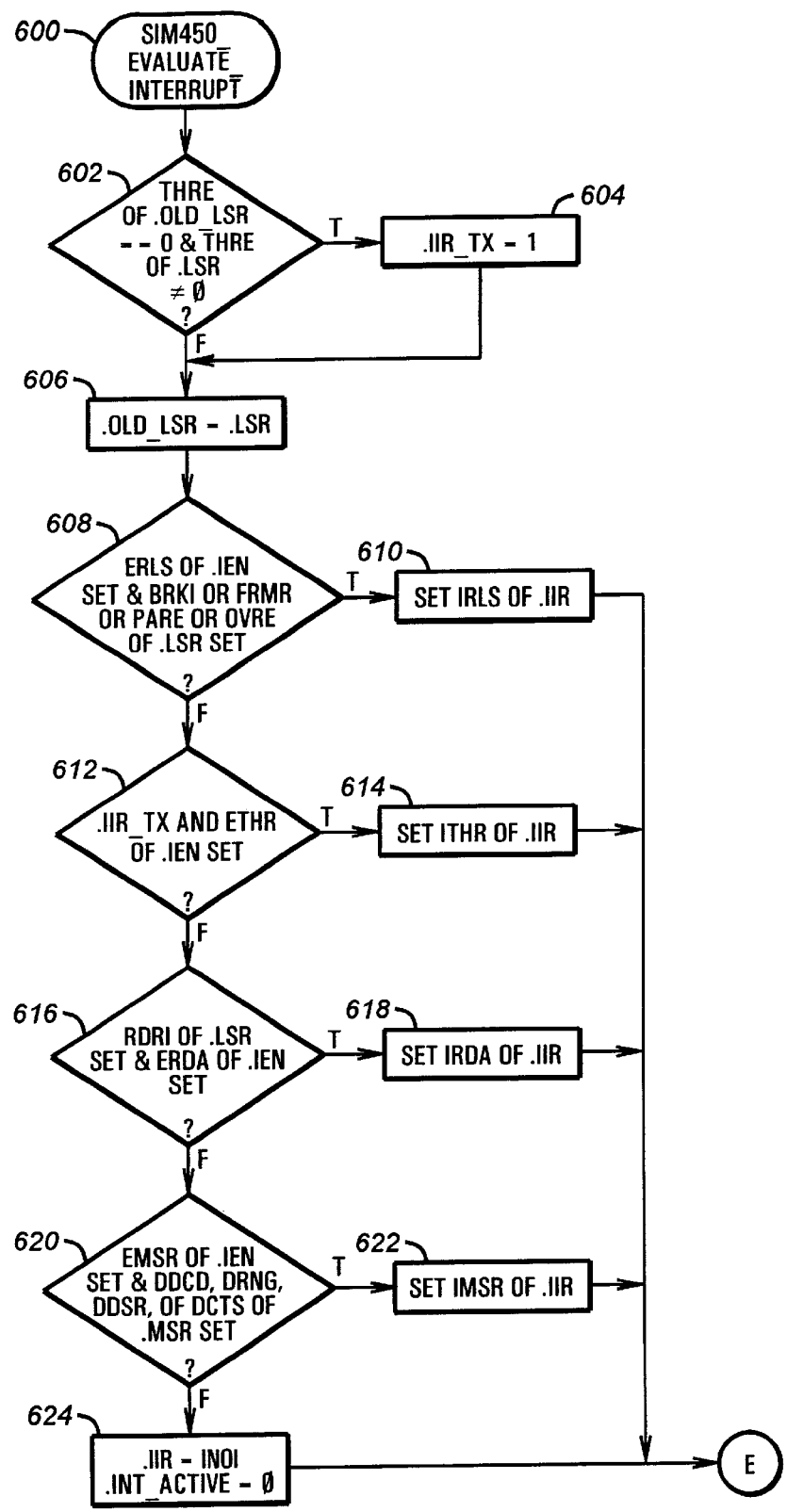
FIGS. 14A and 14B are a flowchart illustration of a SIM450_EVALUATE_INTERRUPT routine that determines when interrupts should be provided by the virtual UART.
Figure 14B:
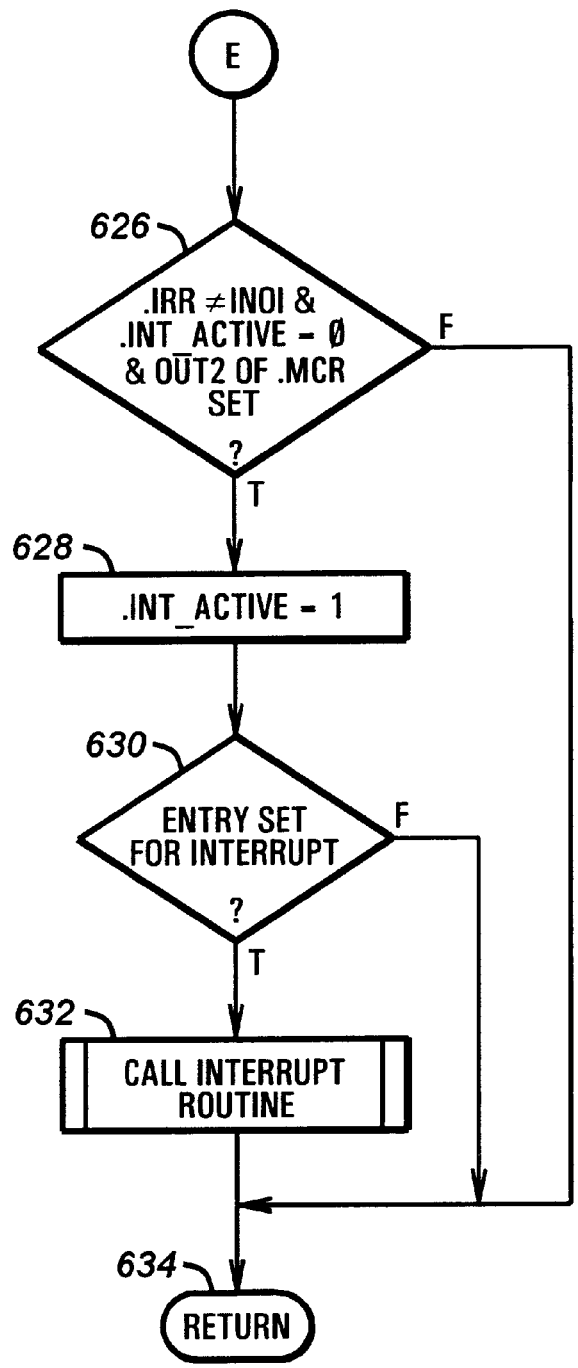

Turning to FIGS. 14A and 14B, the SIM450_EVALUATE_INTERRUPT routine 600, or simply the EVALUATE_INTERRUPT routine 600, is shown. This routine 600 is called when it must be determined whether the virtual UART should cause a soft interrupt to the virtual devices of the operating system. As previously discussed, the operating system will have an interrupt entry point that would be called on a hardware interrupt by a UART, typically the entry point for an interrupt from the IRQ3 or IRQ4 interrupt request line. As part of their initial housekeeping, the virtual device drivers must set up an entry point for such an interrupt. The SIM450.C module includes an entry point that is called with the address to be vectored to on an interrupt from the UART. It sets this entry point as the routine to be called by the SIM450_EVALUATE_INTERRUPT routine 600 when it is appropriate for the virtual UART to execute an interrupt.

Before turning to the specific code of the SIM450_EVALUATE_INTERRUPT routine 600, as a general overview the routine 600 tests to determine whether the various settings of the data variables within the virtual UART indicate that it is appropriate to cause a call to the interrupt service routine within the virtual device drivers of the operating system. Such conditions would be, for example, if the transmit hold register has become empty and the corresponding interrupt is enabled in the interrupt enable register variable .IEN. Other conditions, of course, will also cause interrupts.

Beginning at step 602, the transmit hold register empty bit THRE of the previously stored line status register variable .OLD_LSR is tested, along with the transmit hold register bit THRE of the current line status register variable .LSR. If the THRE is set in the .LSR variable, but is cleared in the .OLD_LSR variable, this means that the transmit hold register has become empty since the previous call to the SIM450_EVALUATE_INTERRUPT routine 600. In that case, control proceeds from step 602 to step 604, where the transmit empty interrupt variable .IRR_TX is set to one, indicating an interrupt condition exists. Otherwise, from step 604, and on a false condition from step 602, control proceeds to step 606, where the old line status register variable .OLD_LSR is loaded with the value of the present line status register variable .LSR.

Proceeding to step 608, various conditions of the interrupt enable register variable .IEN are tested. At step 608, an error in line status register ERLS bit in the interrupt enable variable .IEN is tested, along with the break bit BRKI, frame error bit FRMR, parity error bit PARE, and overrun error bit OVRE of the line status register variable .LSR. The ERLS bit, if true, indicates an interrupt should be initiated on any of these error conditions in the line status register variable .LSR. So if this condition is true, control proceeds from step 608 to step 610, where the interrupt identification register variable .IRR is set with a value corresponding to an interrupt base on the line status register (this value is 06 h).

From step 608, on a false condition, control proceeds to step 612 where the transmit empty interrupt variable .IRR_TX is tested along with the enable transmit hold register interrupt bit ETHR of the interrupt enable register variable .IEN. If both are true, this indicates that interrupts on transmit hold register empty are enabled, and that the transmit hold register has in fact become empty as indicated at step 604 above, or this interrupt has just been enabled, as indicated at step 540 of FIG. 13B. In either case, an interrupt should be executed notifying the operating system that the transmit hold register is empty. So at step 614, the interrupt identification register variable .IRR is set to a value corresponding to such an interrupt (a value of 02 h).

Otherwise, from step 612 control proceeds to step 616, where the receive data ready interrupt bit RDRI of the line status register variable .LSR is tested, along with the enable receive data available interrupt bit ERDA of the interrupt enable register variable .IEN. If both are true, this indicates that data is available from the modem module 114, and interrupts are set to occur when such data is available, so control proceeds to step 618, where the interrupt identification register variable .IRR is again set to an appropriate value (here 04 h).

From step 616, control otherwise proceeds to step 620, where the enable modem status register interrupt bit EMSR of the interrupt enable register variable .IEN is tested, along with the delta bits within the modem status register variable .MSR. The delta bits, when true, indicate the corresponding upper bits of the modem status register variable .MSR have changed since the last read of the .MSR variable. If one of these bits has changed, and the corresponding interrupt is enabled, control proceeds to step 622, where the interrupt identification register variable .IIR is set to a value corresponding to an interrupt based on the modem status register (a value of 0 h).

Otherwise, control falls through from step 620 to step 624, where the interrupt identification register variable .IIR is set to a no interrupt value, which is a value of 01 h. Further, an interrupt active variable .INT_ACTIVE is set false, indicating no interrupt is presently occurring.

At steps 610, 614, 618, and 622 the zero bit of the interrupt identification register variable .IRR is set low, which is its active state, indicating an interrupt is pending, as according to standard UARTs. Therefore, from these steps, an interrupt is set to be pending and the interrupt identification register variable .IRR contains the identification of that type of interrupt. From steps 610, 614, 618, 622, and 624, control proceeds to step 626 (FIG. 14B).

At step 626, the .IIR variable is compared to the no interrupt value INOI, the interrupt active variable .INT_ACTIVE is tested, and the OUT2 bit of the modem control register variable .MCR is tested. If the .IIR variable is not equal to the no interrupt condition, the .INT_ACTIVE variable is false, indicating there is not a current interrupt being handled; and the output OUT2 is enabled, then this indicates that an interrupt should occur, so control proceeds to step 628, where the interrupt active variable .INT_ACTIVE is set to one, indicating than an interrupt is presently occurring, and then to step 630 where it is determined whether an entry has been set for interrupts (which should have occurred on proper initialization of the SIM_450 code). From step 630, if an entry has been set for an interrupt, that interrupt entry is called at step 632. Then otherwise from steps 626 and 630, and always from step 632, control proceeds to step 634, where a return is executed to the calling code.

Regarding the interrupt active variable .INT_ACTIVE, its operation is understood in referring to FIGS. 14A and 14B. If an interrupt is active, the .INT_ACTIVE variable is not reset to false until no interrupts remain pending in the test of steps 608, 612, 616, and 620. This prevents multiple spurious interrupts.

The Modem Module

The above routines illustrate the virtual UART's interface as appears to the various virtual device drivers within the system software. The virtual UART also has an interface to the modem module 114. As previously noted, appropriate code to the modem module 114 is generally offered by a number of modem software developers, such as R. Scott & Associates. These providers generally write controller code that is non-controller specific and in a high level language, so that it can be compiled for execution on a variety of platforms. For example, the controller code as illustrated would be high level code compiled for execution on a 68302 microcontroller, but is now instead compiled for execution on an x86 series of processor as used according to the invention.

Figure 15:
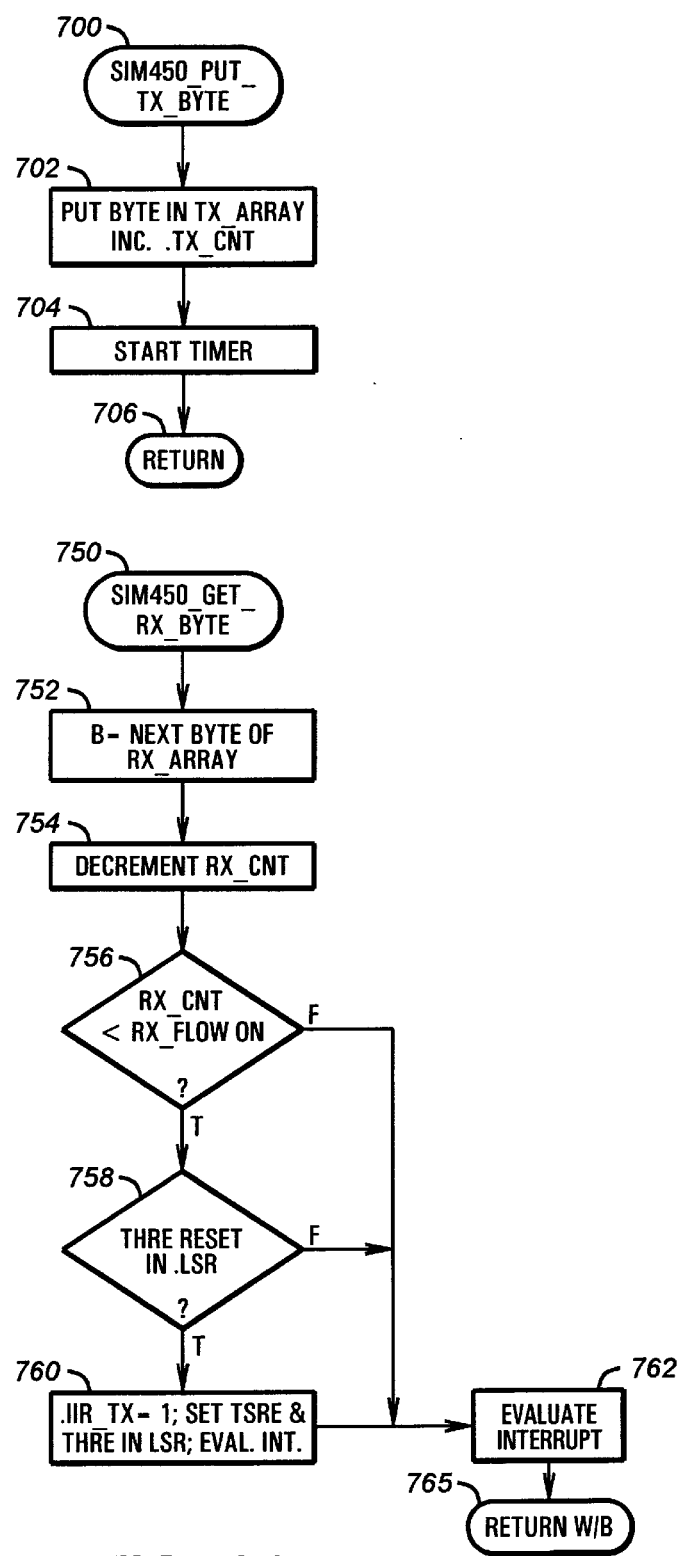
FIG. 15 is a flowchart illustration of two routines used by modem controller code to send data to and receive data from the virtual UART according to the invention.

This controller code will have various "hooks" through which it receives and transmits external data from the computer. Principal examples are illustrated in FIG. 15, SIM450_PUT_TX_BYTE routine 700 and the SIM450_GET_RX_BYTE routine 750.

Beginning at 702, the SIM450_PUT_TX_BYTE routine 700 places a byte in the transmit array TX_ARRAY. Again, the transmit array is from the modem module 114 to the virtual UART. Proceeding to step 704, a timer is started which causes an interrupt to the modem module 114 after a certain period of time (around 10 milliseconds) if the modem module 114 has not been called in the interim. This delay is to allow the modem module 114 to transmit another byte to the virtual UART. The timer is started so that characters can be "expired" out if there is no application draining the UART. In a real UART the characters would be overwritten, causing an OVERRUN error.

In the SIM450_GET_RX_BYTE routine 750, the modem module 114 reads a byte from its receive buffer, which has been filled by the SIM450 routines. Beginning at step 752, a temporary variable B is loaded with the next byte in the receive buffer RX_ARRAY. Proceeding to step 754, the receive buffer count RX_CNT is decremented indicating one less byte is available in that array. Proceeding to step 756, it is determined whether the receive buffer count RX_CNT is less than a flow-on threshold RX_FLOW_ON. If so, the buffer is empty enough to allow more characters from the virtual UART, so control proceeds to step 758, where the transmit hold register empty bit THRE in the line status register variable .LSR is tested. If it is true, control proceeds to step 760, where the transmit empty interrupt variable .IIR_TX is set to one, or true, indicating an interrupt should be provided notifying the virtual device drivers that the virtual UART's transmit hold register is empty. Also, the transmit shift register empty bit TSRE and the transmit hold register bit THRE in the line status register variable .LSR are set to true, indicating these registers are empty and available for accepting data from the virtual device drivers of the operating system. Finally, the EVALUATE_INTERRUPT routine 600 is called to determine whether an interrupt should be provided to the virtual device drivers of the operating system. From steps 756, 758, and 760, control proceeds to step 762, where the EVALUATE_INTERRUPT routine 600 is again called. Finally, proceeding to step 765, the routine returns to the modem module 114 with the value in the temporary B variable as a parameter.

Conclusion

From the foregoing description, it can be understood how the virtual UART is provided as an addition to the modem module 114 such that the modem module 114 can communicate data to and from that virtual UART, yet the virtual UART appears to the operating system software as effectively a physical UART. The only major changes that need to be made in the virtual device drivers that would normally access a physical UART is that device drivers have their input and output instructions replaced with an appropriate macro that redirects these input and output instructions as calls into the virtual UART code.

This software division provides for a very clean path to new operating systems as well as to different modem modules. Because of the virtual UART interface provided on the front of the modem module 114, to move this modem controller to a new operating system simply entails modifying the operating system virtual device drivers to execute calls rather than input/output instructions. No other data structures or parameters need be changed, because the virtual UART for all intents and purposes appears to be a physical UART.

Similarly, if the modem module itself is changed, all that needs to be changed is the interface with the virtual UART.

No modifications of existing virtual device drivers are necessary, because the virtual UART interface stays standardized.

The physical link between the computer system C and the DSP 58 can be implemented in a variety of ways, such as with a number of input/output ports. The modem module 114 also includes hooks for appropriate communications with the DSP. These can be easily modified for whatever type of hardware interface the DSP presents to the modem module 114. Preferably, this is in the form of a PCMCIA card with a standard interface through a number of mailbox registers. The modem module code for implementation of this interface is shown in the source code Appendix E, but again, this is not critical, as there can be a wide variety of interfaces.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the scope and spirit of the invention.

What is claimed is:

1. A general purpose computer system for use with a modem that lacks a microcontroller for executing a modem controller code, where the general purpose computer system executes the modem controller code, comprising:

a processor for executing instructions;

a virtualized UART interface for execution by said processor, said virtualized UART interface communicating data to and from the modem controller code;

an input/output bus coupled to said processor, said input/output bus adapted to communicate with a controllerless hardware modem; and wherein said processor executes both general computer system code and the modem controller code and communicates data and commands between the executed modem controller code and the controllerless hardware modem, an operating system, wherein the virtualized UART interface appears to the operating system to be a physical UART.

2. The computer system of claim 1, further comprising:

a device driver for the physical UART, said device driver called by said operating system to perform serial operations with the physical UART; and wherein said virtualized UART interface provides entry points corresponding to reads from and writes to the physical UART;

wherein said device driver is modified to call said entry points to perform reads from and writes to said virtualized UART interface in place of the physical UART.

3. The computer system of claim 2, wherein said virtualized UART interface emulates a 16450 UART.

4. The computer system of claim 2, wherein said device driver is a WINDOWS® 3.1 virtual device driver.

5. The computer system of claim 2, wherein said device driver is a Windows® 95 virtual device driver.

6. The computer system of claim 2, wherein said processor is an x86 series processor, and wherein the virtual device driver is modified by replacing "IN AL,DX" and "OUT DX,AL" instructions with calls to entry points.

7. The computer system of claim 2, wherein said virtualized UART interface provides a compartmentalized interface to said device driver such that said operating system can be changed to a second operating system with a second device driver without significant modification to said virtualized UART interface.

8. The computer system of claim 2, wherein said virtualized UART interface provides a compartmentalized interface to said device driver such that said controllerless hardware modem can be changed to a second controllerless hardware modem without significant modification to said device driver.

9. A computer system for use with a modem lacking a microcontroller for executing modem controller code, comprising:

a processor for executing instructions, said processor executing the modem controller code;

a virtualized version of a physical hardware interface, said virtualized version executable by the processor to provide a virtualized interface to the executing modem controller code; and a device driver written to communicate with a physical hardware interface, wherein said device driver is modified by replacing instructions directed to the physical hardware interface with calls to said virtualized interface, wherein the physical hardware interface comprises a UART.

10. The computer system of claim 9, wherein said virtualized interface is a virtualized 16450 compatible interface.

11. The computer system of claim 9 wherein said device driver is a WINDOWS® 3.1 virtual device driver.

12. The computer system of claim 9, wherein said device driver is a WINDOWS® 95 virtual device driver.

13. In a general purpose computer system, a method of providing modem communication without a hardware modem controller, the method comprising:

executing on the general purpose computer system modem controller code for communication with a controllerless hardware modem;

providing a hardware interface for communication from the modem controller code to the controllerless hardware modem; and providing a virtualized version of a hardware interface between operating system device driver software on the general purpose computer system and the modem controller code executing on the general purpose computer system, the virtualized version of the hardware interface to emulate the hardware interface, whereby modem commands and data are transmitted between the operating system device driver software and the modem controller code, wherein the hardware interface comprises a UART.

14. A general purpose computer system for use with a modem that lacks a microcontroller for executing a modem controller code, where the general purpose computer system executes the modem controller code, the system comprising:

a processor for executing instructions;

a virtualized UART interface for execution by said processor, said virtualized UART interface communicating data to and from the modem controller code, the virtualized UART interface to emulate a physical UART interface;

a disk drive coupled to said processor for storing the modem controller code;

main memory for storing the modem controller code;

an input/output bus coupled to said processor, said input/output bus adapted to communicate with a controllerless hardware modem; and wherein said processor executes both general computer system code and the modem controller code and communicates data and commands between said executed modem controller code and the controllerless hardware modem.

15. The computer system of claim 14, further comprising:
an operating system for execution by said processor, said operating system stored on said disk drive and in said memory;
a device driver for a hardware UART device, said device driver called by said operating system to perform serial operations with the hardware UART device, said device driver stored on said disk drive and in said main memory; and
wherein said virtualized UART interface provides entry points corresponding to reads from and writes to the hardware UART device, said virtualized UART interface stored on said disk drive and in said main memory;
wherein said device driver is modified to call said entry points to perform reads from and writes to said virtualized UART interface in place of the hardware UART device.

16. A method for providing modem communications in a general purpose communication system, the method comprising:
executing a virtualized UART interface on a processor of the system adapted to execute general purpose computer system codes, wherein the virtualized UART interface emulates a UART;
executing a modem controller code on the processor;
communicating modem commands and data between the virtualized UART interface and the modem controller code;
providing a modem without a controller for communicating over a telecommunications link; and
transmitting data and commands between the modem and the modem controller code.

17. The method of claim 16, further comprising:
modifying a standard operating system device driver to call the virtualized UART interface.

18. The method of claim 17, wherein modifying a standard operating system device driver comprising the step of:
replacing input/output instructions of the processor with calls to the virtualized UART interface.

19. The method of claim 16, wherein executing a virtualized UART interface comprises:
simulating a hardware UART interrupt to an operating system device driver entry point from the virtual UART interface.

20. A general purpose computer system with a modem that lacks a hardware microcontroller, the general purpose computer system comprising:
a processor for executing instructions;
means for controlling the modem;
means for virtualizing a hardware UART;
means for communicating standard modem commands and data between an operating system and the means for virtualizing a hardware UART;
means for communicating standard commands and data between the means for virtualizing a hardware UART and the means for controlling the modem; and
means for transmitting data and commands between the means for controlling the modem and the modem.

21. The general purpose computer system of claim 20, the means for communicating between the operating system and the means for virtualizing a hardware UART comprising:

means for replacing input/output instructions of a standard operating system device driver with calls to the means for virtualizing a hardware UART.

22. The general purpose computer system of claim 20, the means for communicating between the operating system and the means for virtualizing a hardware UART comprising:
means for generating software interrupts by the means for virtualizing a hardware UART.

23. A system comprising:
a controllerless modem;
a software module to emulate a hardware serial interface;
modem controller code; and
a device driver to access the software module instead of the hardware serial interface,
wherein the modem controller code is executable to communicate data with the controllerless modem,
wherein the software module is adapted to emulate a UART.

24. The system of claim 23, wherein the controllerless modem contains a digital signal processor.

25. The system of claim 23, further comprising a processor and general purpose computer code executable on the processor, wherein the modem controller code and the software module are executable on the processor.

26. The system of claim 23, wherein the software module provides entry points corresponding to reads from and writes to the hardware serial interface.

27. The system of claim 26, further comprising an operating system, the device driver to be called by the operating system to perform operations with the hardware serial interface,
wherein the device driver is adapted to call the entry points provided by the software module in response to the call from the operating system.

28. The general purpose computer system of claim 1, further comprising:
an operating system device driver,
the virtualized UART interface to simulate a hardware UART interrupt to the operating system device driver.

29. The general purpose computer system of claim 1, the virtualized UART interface to perform UART functions.

30. The computer system of claim 9, wherein the virtualized version of the physical hardware interface emulates the physical hardware interface.

31. A computer system for use with a modem lacking a microcontroller for executing modem controller code, comprising:
a processor for executing instructions, said processor executing the modem controller code;
a virtualized version of a physical hardware interface, said virtualized version executable by the processor to provide a virtualized interface to the executing modem controller code; and
a device driver written to communicate with a physical hardware interface, wherein said device driver is modified by replacing instructions directed to the physical hardware interface with calls to said virtualized interface,
wherein the virtualized version of the physical hardware interface emulates the physical hardware interface; and
an operating system,
wherein the virtualized version of the physical hardware interface appears to the operating system to be the physical hardware interface.

32. The computer system of claim 9, further comprising an operating system device driver,
   the virtualized version of the physical hardware interface to simulate a hardware interrupt to the operating system device driver by issuing a software interrupt.

33. The method of claim 23, further comprising:
   accessing the virtualized version of the hardware interface identically as if the virtualized version is a real hardware interface.

34. The method of claim 23,
   the virtualized version of the UART performing UART functions.

\* \* \* \* \*